(12) United States Patent
Wang

(10) Patent No.: US 12,470,314 B2
(45) Date of Patent: **\*Nov. 11, 2025**

(54) CLOCK SYNCHRONIZATION METHOD, NETWORK NODE, AND STORAGE MEDIUM

(71) Applicant: TENCENT TECHNOLOGY (SHENZHEN) COMPANY LIMITED, Guangdong (CN)

(72) Inventor: Tao Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/740,237

(22) Filed: Jun. 11, 2024

(65) Prior Publication Data

US 2024/0333412 A1   Oct. 3, 2024

Related U.S. Application Data

(63) Continuation of application No. 17/448,003, filed on Sep. 17, 2021, now Pat. No. 12,047,164, which is a
(Continued)

(30) Foreign Application Priority Data

Sep. 27, 2019   (CN) .......................... 201910931948.1

(51) Int. Cl.
  *H04J 3/06*   (2006.01)
  *H04W 56/00*  (2009.01)
  *H04W 84/04*  (2009.01)

(52) U.S. Cl.
  CPC .......... *H04J 3/0697* (2013.01); *H04J 3/0658* (2013.01); *H04W 56/001* (2013.01); *H04W 84/042* (2013.01)

(58) Field of Classification Search
  None
  See application file for complete search history.

(56) References Cited

U.S. PATENT DOCUMENTS 8,145,247 B2    3/2012  Fullam
12,047,164 B2 *  7/2024  Wang .................. H04J 3/12
(Continued)

FOREIGN PATENT DOCUMENTS

CN    102440039 A    5/2012
CN    110167132 A    8/2019
(Continued)

OTHER PUBLICATIONS

"Update to Solution 11 Option 2 TSN Time Synchronization". Nokia, Qualcomm Incorporated, SA WG2 Meeting #131, S2-1902064, Mar. 1, 2019, 8 pages.
(Continued)

*Primary Examiner* — Phirin Sam
(74) *Attorney, Agent, or Firm* — ArentFox Schiff LLP

(57) ABSTRACT

A user-plane network node and a method for clock synchronization are provided. The method includes determining, with processing circuitry of the user-plane network node, a time difference between a system clock of an external network of the user-plane network node and a system clock of a network to which the user-plane network node belongs. The method includes transmitting, to a control-plane network node, information including the time difference. The time difference is used by the control-plane network node to determine a time parameter of the system clock of the network to which the user-plane network node belongs. The time parameter is time-sensitive communication assistance information. The transmitting the information is independent of a particular Protocol Data Unit (PDU) session.

20 Claims, 10 Drawing Sheets

Related U.S. Application Data continuation of application No. PCT/CN2020/115050, filed on Sep. 14, 2020.

(56) References Cited

U.S. PATENT DOCUMENTS

| | | | |
|---|---|---|---|
| 2008/0287153 A1 | 11/2008 | Fullam | |
| 2010/0087191 A1* | 4/2010 | Kocsis | H04L 63/0853 |
| | | | 455/433 |
| 2011/0158164 A1 | 6/2011 | Palanki et al. | |
| 2015/0092642 A1* | 4/2015 | Geboff | H04L 69/329 |
| | | | 370/350 |
| 2016/0270017 A1 | 9/2016 | Palanki et al. | |
| 2017/0248678 A1 | 8/2017 | Markhovsky et al. | |
| 2017/0332192 A1 | 11/2017 | Edge | |
| 2018/0049146 A1* | 2/2018 | Daley | H04H 20/38 |
| 2020/0077352 A1 | 3/2020 | Yu et al. | |
| 2020/0099382 A1* | 3/2020 | Mautner | G06F 13/122 |
| 2020/0245136 A1 | 7/2020 | Tang | |
| 2020/0383160 A1 | 12/2020 | Faccin et al. | |
| 2021/0112483 A1 | 4/2021 | Xiaowan | |
| 2021/0119717 A1 | 4/2021 | Li et al. | |
| 2021/0136864 A1 | 5/2021 | Gan et al. | |
| 2021/0153151 A1 | 5/2021 | Yin et al. | |
| 2021/0281580 A1 | 9/2021 | Eisen | |
| 2022/0353942 A1 | 11/2022 | Park et al. | |
| 2023/0247705 A1 | 8/2023 | Kumar et al. | |
| 2023/0354447 A1 | 11/2023 | Talebi et al. | |

FOREIGN PATENT DOCUMENTS

| | | |
|---|---|---|
| CN | 110535552 A | 12/2019 |
| EP | 3322232 A1 | 5/2018 |
| EP | 3522623 A1 | 8/2019 |

OTHER PUBLICATIONS

International Search Report and Written Opinion received for PCT Patent Application No. PCT/CN2020/115050, mailed on Dec. 1, 2020, 14 pages.(14 pages of English Translation and 5 pages of Original Document).

Supplementary European Search Report issued Oct. 25, 2022 in Application No. 20869928.0. (8 pages).

* cited by examiner

CLOCK SYNCHRONIZATION METHOD, NETWORK NODE, AND STORAGE MEDIUM

RELATED APPLICATIONS

This application is a continuation of U.S. application Ser. No. 17/448,003, filed on Sep. 17, 2021, which is a continuation of International Application No. PCT/CN2020/115050, filed on Sep. 14, 2020, which claims priority to Chinese Patent Application No. 201910931948.1, entitled "NETWORK NODE EXECUTION METHOD AND CORRESPONDING NETWORK NODE" filed on Sep. 27, 2019. The entire disclosures of the prior applications are hereby incorporated by reference in their entirety.

FIELD OF THE TECHNOLOGY

The present disclosure relates to the field of wireless communication, including a clock synchronization method, a network node, and a storage medium.

BACKGROUND OF THE DISCLOSURE

Compared with a conventional communication system, a relatively large change occurs in a core network architecture of a 5G communication system. Specifically, a mobility management entity (MME) in a core network of the conventional communication system is replaced with a control plane function (CPF) entity, and functions of the MME are decomposed into an access and mobility management function (AMF) entity and a session management function (SMF) entity. In addition, a serving gateway (SGW) and a PDN gateway (PGW) in the core network of the conventional communication system are replaced with a user plane function (UPF) entity.

Moreover, time-sensitive communication (TSC) in time-sensitive networking (TSN) is introduced into the 5G communication system to support industrial automation manufacturing applications that require high time accuracy. To enable a 5G radio access network (RAN) to perform accurate time control on a data flow, the SMF entity can generate TSC assistance information (TSCAI) according to service information provided by an application function (AF) entity, and provide the TSCAI to the RAN, so that the RAN can perform accurate time control on the data flow according to the TSCAI.

In a protocol data unit (PDU) session of home routed roaming of TSN communication, in a scenario in which a terminal is roaming and a Home-SMF (H-SMF, an SMF in a home public land mobile network (HPLMN)) and a Visited-SMF (V-SMF, an SMF in a visited public land mobile network (VPLMN)) are temporally synchronized, the H-SMF may generate the TSCAI according to the service information provided by the AF entity, and provide the generated TSCAI to the V-SMF. Then, the V-SMF provides the TSCAI to the RAN, for the RAN to perform accurate time control on the data flow according to the TSCAI.

However, the V-SMF and the H-SMF may be temporally asynchronized. For example, clock skew is caused by a time difference between the VPLMN and the HPLMN in time domain (for example, time zones are different) or different master clocks used by the VPLMN and the HPLMN even if the VPLMN and the HPLMN are in the same time zone. In this case, the TSCAI provided by the V-SMF to the RAN according to the foregoing process is inaccurate. As a result, the RAN cannot perform accurate time control on the data flow.

SUMMARY

In a first aspect, in a method executed by a user-plane network node, a time difference between a system clock of an external network of the user-plane network node and a system clock of a network that the user-plane network node belongs is ascertained. Then information including the time difference is transmitted to a control-plane network node. The time difference is for the control-plane network node to ascertain a time parameter of the system clock of the network that the user-plane network node belongs, and the time parameter is a supplementary information for time-sensitive communication. The process for the transmitting the information is independent of a particular Protocol Data Unit (PDU) session.

In a second aspect, in a method executed by a control-plane network node, information including a time difference between a system clock of an external network of a user-plane network node and a system clock of a network that the user-plane network node belongs is received from the user-plane network node. The time difference is for the control-plane network node to ascertain a time parameter of the system clock of the network that the user-plane network node belongs, and the time parameter is a supplementary information for time-sensitive communication. A process for the receiving the information is independent of a particular Protocol Data Unit (PDU) session. The time parameter of the system clock of the network that the user-plane network node belongs based on the received information and a time parameter of the system clock of the external network of the user-plane network node is then ascertained.

In a third aspect, a user-plane network node includes processing circuitry that ascertains a time difference between a system clock of an external network of the user-plane network node and a system clock of a network that the user-plane network node belongs. The circuitry also transmits, to a control-plane network node, information including the time difference. The time difference is for the control-plane network node to ascertain a time parameter of the system clock of the network that the user-plane network node belongs, and the time parameter is a supplementary information for time-sensitive communication. The process for the transmitting the information is independent of a particular Protocol Data Unit (PDU) session.

BRIEF DESCRIPTION OF THE DRAWINGS

The foregoing and other objectives, features and advantages of the present disclosure are better understood through a more detailed description of exemplary embodiments of the present disclosure with reference to the accompanying drawings. Thus, the accompanying drawings are intended to provide further understanding of the present disclosure and constitute a part of this specification. However, the accompanying drawings are merely illustrative of exemplary embodiments of the present disclosure, and not limiting thereon. In the accompanying drawings, the same reference numerals generally represent the same components or steps.

DESCRIPTION OF EMBODIMENTS

Figure 1:
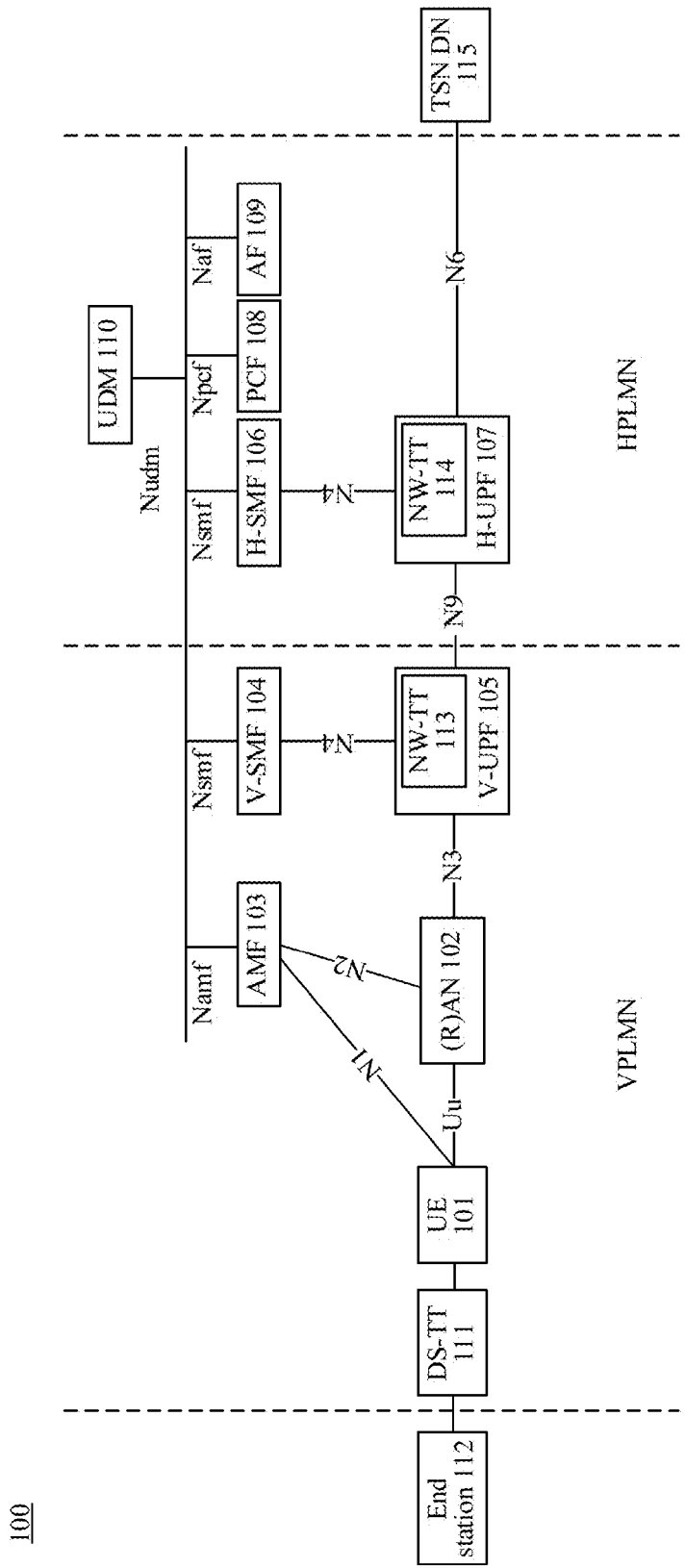
FIG. 1 is a schematic diagram of an architecture of a wireless TSC system according to an embodiment of the present disclosure.

To make the objectives, technical solutions, and advantages of the present disclosure more obvious, exemplary embodiments of the present disclosure are described in detail below with reference to the accompanying drawings. In the accompanying drawings, the same reference numerals represent the same components throughout the description. It is to be understood that the described embodiments are merely illustrative and are not to be construed as limiting the scope of the present disclosure. In addition, the terminal described herein may include various types of user equipment (UE) such as a mobile terminal or a fixed terminal. For convenience, the UE and the terminal are sometimes used interchangeably in the following.

First, FIG. 1 shows an architecture of a wireless TSC system according to an embodiment of the present disclosure. The wireless TSC system is a schematic architecture for a terminal roaming communication (for example, home routed roaming) scenario. The wireless TSC system may include an HPLMN and a VPLMN. The HPLMN and/or the VPLMN herein may be a 5G communication system, or any other type of wireless communication system, for example, a 6G communication system. In the following, the 5G communication system is used as an example to describe the embodiments of the present disclosure, but it is to be understood that the following description may also be applied to other types of wireless communication systems. In addition, the wireless TSC system may further include a time-sensitive networking (TSN) data network (DN) (TSN DN).

Specifically, as shown in FIG. 1, the wireless TSC system 100 includes UE 101, a (radio) access network ((R)AN) 102, an AMF entity 103, a V-SMF entity 104, a Visited-UPF (V-UPF, a UPF in a VPLMN) entity 105, an H-SMF entity 106, an H-UPF (Home-UPF, a UPF in an HPLMN) entity 107, a policy control function (PCF) entity 108, an AF entity 109, a unified data management (UDM) entity 110, a service translator 111 corresponding to the UE 101, an end station 112, a service translator 113 corresponding to the V-UPF entity 105, a service translator 114 corresponding to the H-UPF entity 107, a TSN DN 115, and the like. The entities described herein may be one or more servers. In the embodiments of the present disclosure, the "entity" may also be referred to as a node. For convenience, the entity and the node are sometimes used interchangeably in the following.

The AMF entity 103 and the V-SMF entity 104 described herein are control plane network nodes in the VPLMN, and may be briefly referred to as visited-control plane network nodes. The V-UPF entity 105 is a user plane network node in the VPLMN, and may be briefly referred to as a visited-user plane network node. The H-SMF entity 106 is a control plane network node in the HPLMN, and may be briefly referred to as a home-control plane network node. The H-UPF entity 107 is a user plane network node in the HPLMN, and may be briefly referred to as a home-user plane network node.

In this embodiment of the present disclosure, the (R)AN 102 may be an access network formed by a base station. The base station herein may be any type of base station, for example, a 5G base station, or a base station or a Wi-Fi AP in the conventional communication system. In addition, the AMF entity 103 may support access authentication, mobility management, registration management, connection management, and authorized answering of the UE, and support transmission of session management information between the UE and the SMF entity. The V-SMF entity 104 and the H-SMF entity 106 are similar, and may both support session management, where the session management may include session establishment, modification, and release. The V-UPF entity 105 and the H-UPF entity 107 are similar, and may both have a data packet routing function, for example, may obtain a data packet from the TSN DN 115, and transmit a data packet to the (R)AN 102. The PCF entity 108 may support a unified policy framework in managing network behaviors, provide a policy rule to control a control plane, and the like. The AF entity 109 may support application impact on a service path, interact with a measurement framework for policy control, and the like. The UDM entity 110 may support user identification processing, subscription data-based access authorization (for example, roaming restriction), support service/session continuity, and the like. The service translator 111 corresponding to the UE 101 may be a time-sensitive service translator, for example, a device-side TSN translator (DS-TT). The DS-TT may support hold and forward functions for eliminating jitter, link layer connectivity discovery and reporting, and the like. The service translator 113 corresponding to the V-UPF entity 105 and/or the service translator 114 corresponding to the H-UPF entity

107 may also be a time-sensitive service translator, for example, a network-side TSN translator (NW-TT). The NW-TT, similar to the DS-TT, may also support hold and forward functions for eliminating jitter, link layer connectivity discovery and reporting, and the like.

In addition, the UE 101 may be connected to the (R)AN 102 through a Uu interface, and connected to the AMF entity 103 through an N1 interface. The (R)AN 102 may be connected to the AMF entity 103 through an N2 interface, and connected to the V-UPF entity 105 through an N3 interface. The V-UPF entity 105 may be connected to the V-SMF entity 104 through an N4 interface, and connected to the H-UPF entity 107 through an N9 interface. The H-UPF entity 107 may be connected to the H-SMF entity 106 through an N4 interface, and connected to the TSN DN 115 through an N6 interface. The V-SMF entity 104 and the H-SMF entity 106 may be each connected to the PCF entity 108 through an Nsmf interface and an Npcf interface. The PCF entity 108 may be connected to the UDM entity 110 through the Npcf interface and an Nudm interface. The AF entity 109 may be connected to the UDM entity 110 through an Naf interface and the Nudm interface. The AMF entity 103 may be connected to the PCF entity 108 through an Namf interface and the Npcf interface. The 3GPP standard specification has defined the various interfaces mentioned herein, and therefore details are not described again. In addition, the UE 101 may communicate with the end station 112 through the DS-TT, and the H-UPF entity 107 may communicate with the TSN DN 115 through the NW-TT.

In addition, in the example of FIG. 1, the NW-TT is integrated in the UPF entity. However, this embodiment of the present disclosure is not limited thereto. For example, the NW-TT and the UPF entity may be two independent devices.

In the embodiments of the present disclosure, clock synchronization may be implemented based on a PDU session of home routed roaming of TSN communication. Specifically, the clock synchronization method according to the embodiments of the present disclosure may be performed in an establishment process or modification process of the PDU session of the home routed roaming of the TSN communication. For example, in the establishment process of the PDU session of the home routed roaming of the TSN communication, a visited-control plane network node (for example, the V-SMF entity 104) may transmit information used for indicating a time parameter determining manner supported by the visited-control plane network node to a home-control plane network node (for example, the H-SMF entity 106), and receive, from the home-control plane network node, information used for indicating a time parameter determining manner to be used by the visited-control plane network node, so that the time parameter determining manner to be used by the visited-control plane network node is controlled by the home-control plane network node, and the visited-control plane network node determines a time parameter according to the time parameter determining manner, to provide an accurate time parameter to a RAN (for example, the (R)AN 102). In this way, a problem of inaccurate "burst arrival time" in TSCAI due to clock skew caused by a time difference between a VPLMN and an HPLMN or different master clocks used by the VPLMN and the HPLMN even if the VPLMN and the HPLMN are in the same time zone is avoided.

Figure 2:
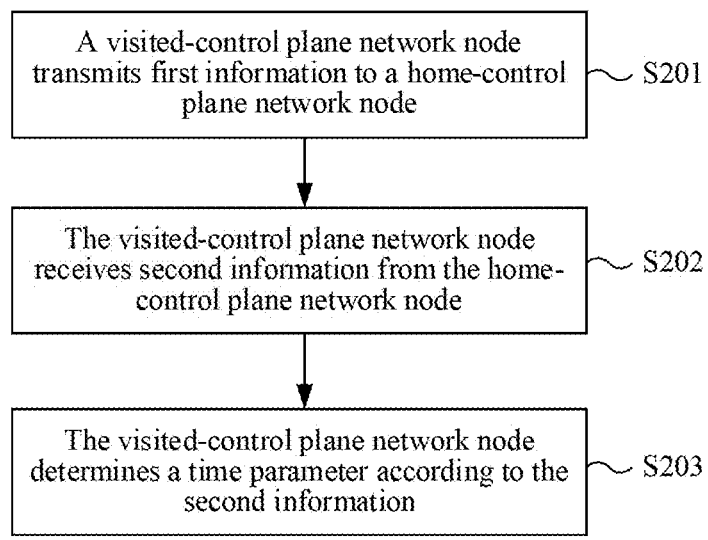
FIG. 2 is a flowchart of a clock synchronization method according to an embodiment of the present disclosure.

FIG. 2 describes a clock synchronization method according to an embodiment of the present disclosure below. The method is performed by a visited-control plane network node. FIG. 2 is a flowchart of a clock synchronization method 200 according to an embodiment of the present disclosure. As shown in FIG. 2, in step S201, the visited-control plane network node transmits first information to a home-control plane network node, the first information indicating a time parameter determining manner supported by the visited-control plane network node.

In this embodiment of the present disclosure, there may be one or more time parameter determining manners supported by the visited-control plane network node. For example, there may be three time parameter determining manners supported by the visited-control plane network node, namely, a first determining manner, a second determining manner, and a third determining manner. Specifically, the first determining manner may mean that the visited-control plane network node determines a time parameter partially with the help of the home-control plane network node, the second determining manner may mean that the visited-control plane network node determines a time parameter completely with the help of the home-control plane network node, and the third determining manner may mean that the visited-control plane network node determines a time parameter without the help of the home-control plane network node. Such a plurality of determining manners may be applied to different operators, thereby enhancing universality of applications.

According to a first implementation of the embodiments of the present disclosure, the visited-control plane network node may generate the first information according to a measurement capability of a visited-user plane network node (for example, the V-UPF entity 105 in FIG. 1) to a time difference between system clocks of different networks. Specifically, the visited-control plane network node may first determine the measurement capability of the visited-user plane network node to the time difference between the system clocks of the different networks. Subsequently, the visited-control plane network node may determine, according to the measurement capability of the visited-user plane network node to the time difference between the system clocks of the different networks, the time parameter determining manner that the visited-control plane network node can support. Then, the visited-control plane network node may generate the first information according to the determined time parameter determining manner.

The "time difference between system clocks of different networks" described herein may include at least one of a time difference between a system clock of a TSN DN (for example, a TSN DN connected by a data network name (DNN) when UE establishes a PDU session) and a system clock of a network (that is, a VPLMN) to which the visited-control plane network node belongs, a time difference between the system clock of the network (that is, the VPLMN) to which the visited-control plane network node belongs and a system clock of a network (that is, an HPLMN) to which the home-control plane network node belongs, and the like.

In the example that the "time difference between system clocks of different networks" includes the time difference between the system clock of the TSN DN and the system clock of the network (that is, the VPLMN) to which the visited-control plane network node belongs, the visited-control plane network node may first determine a measurement capability of the visited-user plane network node to the time difference between the system clock of the TSN DN and the system clock of the network (that is, the VPLMN) to which the visited-control plane network node belongs. When the visited-user plane network node can measure the time difference between the system clock of the TSN DN and the system clock of the network (that is, the VPLMN) to which the visited-control plane network node belongs, the visited-control plane network node may determine a time parameter without the help of the home-control plane network node. Therefore, the visited-control plane network node may determine that the visited-control plane network node can support the third determining manner. Then, the visited-control plane network node may generate the first information according to the third determining manner.

In the example that the "time difference between system clocks of different networks" includes the time difference between the system clock of the network (that is, the VPLMN) to which the visited-control plane network node belongs and the system clock of the network (that is, the HPLMN) to which the home-control plane network node belongs, the visited-control plane network node may first determine a measurement capability of the visited-user plane network node to the time difference between the system clock of the network (that is, the VPLMN) to which the visited-control plane network node belongs and the system clock of the network (that is, the HPLMN) to which the home-control plane network node belongs. When the visited-user plane network node can measure the time difference between the system clock of the network (that is, the VPLMN) to which the visited-control plane network node belongs and the system clock of the network (that is, the HPLMN) to which the home-control plane network node belongs, the visited-control plane network node may determine a time parameter partially or completely with the help of the home-control plane network node. Therefore, the visited-control plane network node may determine that the visited-control plane network node can support the first determining manner and the second determining manner. Then, the visited-control plane network node may generate the first information according to the first determining manner and/or the second determining manner.

In the example that the "time difference between system clocks of different networks" includes the time difference between the system clock of the TSN DN and the system clock of the network (that is, the VPLMN) to which the visited-control plane network node belongs, and the time difference between the system clock of the network (that is, the VPLMN) to which the visited-control plane network node belongs and the system clock of the network (that is, the HPLMN) to which the home-control plane network node belongs, the visited-control plane network node may first determine a measurement capability of the visited-user plane network node to the time difference between the system clock of the TSN DN and the system clock of the network (that is, the VPLMN) to which the visited-control plane network node belongs, and the time difference between the system clock of the network (that is, the VPLMN) to which the visited-control plane network node belongs and the system clock of the network (that is, the HPLMN) to which the home-control plane network node belongs. When the visited-user plane network node can measure the time difference between the system clock of the TSN DN and the system clock of the network (that is, the VPLMN) to which the visited-control plane network node belongs, and can measure the time difference between the system clock of the network (that is, the VPLMN) to which the visited-control plane network node belongs and the system clock of the network (that is, the HPLMN) to which the home-control plane network node belongs, the visited-control plane network node may determine a time parameter without or partially or completely with the help of the home-control plane network node. Therefore, the visited-control plane network node may determine that the visited-control plane network node can support the first determining manner, the second determining manner, and the third determining manner. Then, the visited-control plane network node may generate the first information according to the first determining manner, and/or the second determining manner, and/or the third determining manner.

Figure 3:
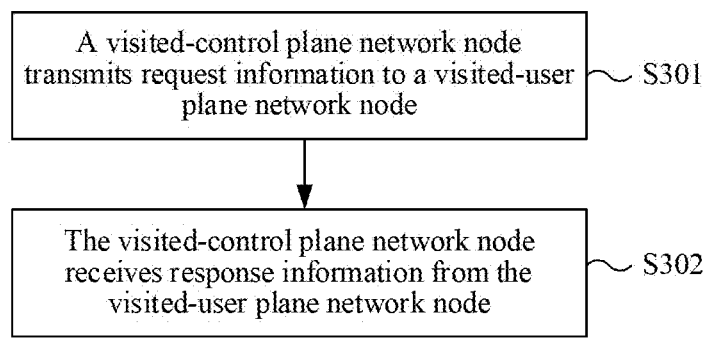
FIG. 3 is a flowchart of a method for a visited-control plane network node to determine a measurement capability of a visited-user plane network node to a time difference between system clocks of different networks according to an embodiment of the present disclosure.

In the first implementation, the visited-control plane network node may determine the measurement capability of the visited-user plane network node to the time difference between the system clocks of the different networks by using a method shown in FIG. 3. FIG. 3 is a flowchart of a method 300 for a visited-control plane network node to determine a measurement capability of a visited-user plane network node to a time difference between system clocks of different networks according to an embodiment of the present disclosure.

As shown in FIG. 3, in step S301, the visited-control plane network node transmits request information to the visited-user plane network node, the request information being used for requesting the visited-user plane network node to feed back the measurement capability of the visited-user plane network node to the time difference between the system clocks of the different networks to the visited-control plane network node. For example, the request information may be used for requesting the visited-user plane network node to feed back, to the visited-control plane network node, the measurement capability of the visited-user plane network node to at least one of the time difference between the system clock of the TSN DN and the system clock of the network (that is, the VPLMN) to which the visited-control plane network node belongs, the time difference between the system clock of the network (that is, the VPLMN) to which the visited-control plane network node belongs and the system clock of the network (that is, the HPLMN) to which the home-control plane network node belongs, and the like.

In step S302, the visited-control plane network node receives response information from the visited-user plane network node, the response information indicating the measurement capability of the visited-user plane network node to the time difference between the system clocks of the different networks. Specifically, the response information may include a predetermined quantity of bits, and values of the predetermined quantity of bits may indicate the measurement capability of the visited-user plane network node to the time difference between the system clocks of the different networks.

For example, the response information may include two bits, and "00" in four values "00", "01", "10", and "11" of the two bits may indicate that the visited-user plane network node can measure neither the time difference between the system clock of the TSN DN and the system clock of the network (that is, the VPLMN) to which the visited-control plane network node belongs, nor the time difference between the system clock of the network (that is, the VPLMN) to which the visited-control plane network node belongs and the system clock of the network (that is, the HPLMN) to which the home-control plane network node belongs. If the two bits are "01," this may indicate that the visited-user plane network node cannot measure the time difference between the system clock of the TSN DN and the system clock of the network (that is, the VPLMN) to which the visited-control plane network node belongs, but can measure the time difference between the system clock of the network (that is, the VPLMN) to which the visited-control plane network node belongs and the system clock of the network (that is, the HPLMN) to which the home-control plane network node belongs. If the two bits are "10," this may indicate that the visited-user plane network node can measure the time difference between the system clock of the TSN DN and the system clock of the network (that is, the VPLMN) to which the visited-control plane network node belongs, but cannot measure the time difference between the system clock of the network (that is, the VPLMN) to which the visited-control plane network node belongs and the system clock of the network (that is, the HPLMN) to which the home-control plane network node belongs. If the two bits are "11," this may indicate that the visited-user plane network node can measure both the time difference between the system clock of the TSN DN and the system clock of the network (that is, the VPLMN) to which the visited-control plane network node belongs and the time difference between the system clock of the network (that is, the VPLMN) to which the visited-control plane network node belongs and the system clock of the network (that is, the HPLMN) to which the home-control plane network node belongs.

In addition, according to a second implementation of the embodiments of the present disclosure, the visited-control plane network node may generate the first information according to a measurement capability of the visited-control plane network node to the time difference between the system clocks of the different networks. Specifically, the visited-control plane network node may determine, according to the measurement capability of the visited-control plane network node to the time difference between the system clocks of the different networks, the time parameter determining manner that the visited-control plane network node can support. Then, the visited-control plane network node may generate the first information according to the determined time parameter determining manner.

The "time difference between system clocks of different networks" is described above, and therefore details are not described herein again.

In the example that the "time difference between system clocks of different networks" includes the time difference between the system clock of the TSN DN and the system clock of the network (that is, the VPLMN) to which the visited-control plane network node belongs, the visited-control plane network node may first determine the measurement capability of the visited-control plane network node to the time difference between the system clock of the TSN DN and the system clock of the network (that is, the VPLMN) to which the visited-control plane network node belongs. When the visited-control plane network node can measure the time difference between the system clock of the TSN DN and the system clock of the network (that is, the VPLMN) to which the visited-control plane network node belongs, the visited-control plane network node may determine the time parameter without the help of the home-control plane network node. Therefore, the visited-control plane network node may determine that the visited-control plane network node can support the third determining manner. Then, the visited-control plane network node may generate the first information according to the third determining manner.

In the example that the "time difference between system clocks of different networks" includes the time difference between the system clock of the network (that is, the VPLMN) to which the visited-control plane network node belongs and the system clock of the network (that is, the HPLMN) to which the home-control plane network node belongs, the visited-control plane network node may first determine a measurement capability of the visited-control plane network node to the time difference between the system clock of the network (that is, the VPLMN) to which the visited-control plane network node belongs and the system clock of the network (that is, the HPLMN) to which the home-control plane network node belongs. When the visited-control plane network node can measure the time difference between the system clock of the network (that is, the VPLMN) to which the visited-control plane network node belongs and the system clock of the network (that is, the HPLMN) to which the home-control plane network node belongs, the visited-control plane network node may determine the time parameter partially or completely with the help of the home-control plane network node. Therefore, the visited-control plane network node may determine that the visited-control plane network node can support the first determining manner and the second determining manner. Then, the visited-control plane network node may generate the first information according to the first determining manner and/or the second determining manner.

In the example that the "time difference between system clocks of different networks" includes the time difference between the system clock of the TSN DN and the system clock of the network (that is, the VPLMN) to which the visited-control plane network node belongs, and the time difference between the system clock of the network (that is, the VPLMN) to which the visited-control plane network node belongs and the system clock of the network (that is, the HPLMN) to which the home-control plane network node belongs, the visited-control plane network node may first determine a measurement capability of the visited-control plane network node to the time difference between the system clock of the TSN DN and the system clock of the network (that is, the VPLMN) to which the visited-control plane network node belongs, and the time difference between the system clock of the network (that is, the VPLMN) to which the visited-control plane network node belongs and the system clock of the network (that is, the HPLMN) to which the home-control plane network node belongs. When the visited-control plane network node can measure the time difference between the system clock of the TSN DN and the system clock of the network (that is, the VPLMN) to which the visited-control plane network node belongs, and can measure the time difference between the system clock of the network (that is, the VPLMN) to which the visited-control plane network node belongs and the system clock of the network (that is, the HPLMN) to which the home-control plane network node belongs, the visited-control plane network node may determine the time parameter without or partially or completely with the help of the home-control plane network node. Therefore, the visited-control plane network node may determine that the visited-control plane network node can support the first determining manner, the second determining manner, and the third determining manner. Then, the visited-control plane network node may generate the first information according to the first determining manner, and/or the second determining manner, and/or the third determining manner.

In addition, according to a third implementation of the embodiments of the present disclosure, the visited-control plane network node may generate the first information according to both the measurement capability of the visited-user plane network node (for example, the V-UPF entity 105 in FIG. 1) to the time difference between the system clocks of the different networks and the measurement capability of the visited-control plane network node to the time difference between the system clocks of the different networks. The third implementation is a combination of the first implementation and the second implementation described above, and details are not described herein again.

In the foregoing first implementation, second implementation, and third implementation, the first information may implicitly or explicitly indicate the time parameter determining manner supported by the visited-control plane network node, which is not limited in this embodiment of the present disclosure.

In addition, in the second determining manner, the visited-control plane network node determines the time parameter completely with the help of the home-control plane network node. Therefore, the visited-control plane network node can always support the second determining manner. Therefore, the first information may not indicate the second determining manner.

Returning to FIG. 2, in step S202, the visited-control plane network node receives second information from the home-control plane network node, the second information indicating a time parameter determining manner to be used by the visited-control plane network node. For example, the home-control plane network node may determine, according to the first information in step S201, time parameter determining manners supported by the visited-control plane network node, and select one of the time parameter determining manners supported by the visited-control plane network node as the time parameter determining manner to be used by the visited-control plane network node. Then, the home-control plane network node may notify the visited-control plane network node through the second information in step S202.

After step S202, the method 200 may further include step S203. In step S203, the visited-control plane network node determines the time parameter according to the second information. Specifically, the visited-control plane network node may determine, according to the second information, the time parameter determining manner to be used by the visited-control plane network node, and then determine the time parameter by using the determined time parameter determining manner.

The "time parameter" described herein may be TSCAI based on the system clock of the network (that is, the VPLMN) to which the visited-control plane network node belongs. The TSCAI describes TSC traffic features for a 5G system. Knowledge of a TSN traffic pattern is useful for a 5G base station (for example, gNB), so that the 5G base station can more effectively schedule a periodic and deterministic service flow through configuration authorization, semi-persistent scheduling, or dynamic authorization. The TSCAI may include one or more of information indicating a direction of a TSC service (for example, an uplink or a downlink), transmission period of data in the TSC service, burst arrival time in the TSC service, and the like. For example, for a definition of the TSCAI, reference may be made to Table 1 below. In addition, the TSCAI may be provided to a RAN in the 5G system by an SMF. For example, the SMF may provide the TSCAI to the RAN in the 5G system in a process of establishing a quality of service flow (QOS flow).

TABLE 1

Definition of the TSCAI

| Assistance information | Description |
| --- | --- |
| Direction of a data flow | Direction of a TSC flow (an uplink or a downlink) |
| Periodicity | Time period between start of two bursts |
| Burst arrival time | Arrival time of a data burst at an entrance (a direction of a downlink flow) of the RAN or an exit interface (a direction of an uplink flow) of the UE |

In Table 1, the TSCAI includes burst arrival time of service data and periodicity of the service data. A first data packet of the service data arrives at the burst arrival time, and after the burst arrival time, other data packets of the service data arrive at the RAN in the 5G system one by one within time specified by the periodicity of the service data.

Specifically, for the downlink, the burst arrival time in the TSC service may be time when data arrives at the RAN from a UPF. Specifically, burst arrival time $T_{DL}$ in the downlink may be determined according to the following formula (1):

$$T_{DL} = T_1 + \text{offset}_{(TSN,PLMN)} + \text{delay}_{(NW-TT,RAN)} \quad \text{formula (1)}$$

where $T_1$ represents time when the data arrives at an NW-TT, and is downlink "burst arrival time" provided by an AF to an SMF, $\text{offset}_{(TSN, PLMN)}$ represents a time difference between a system clock of a TSN DN and a system clock of a PLMN, and may be measured by the SMF or measured by a UPF and reported to the SMF, and $\text{delay}_{(NW-TT, RAN)}$ represents a transmission delay from the NW-TT to the RAN.

In a scenario in which a terminal is roaming, the formula (1) may be modified into the following formula (2):

$$T_{DL} = T_1 + \text{offset}_{(TSN,VPLMN)} + \text{delay}_{(V-UPF,RAN)} + \quad \text{formula (2)}$$
$$\text{delay}_{(H-UPF-NW-TT,V-UPF)}$$

where $\text{delay}_{(H-UPF-NW-TT, V-UPF)}$ represents a transmission delay from an H-UPF-NW-TT to a V-UPF, and $\text{delay}_{(V-UPF, RAN)}$ represents a transmission delay from the V-UPF to the RAN. Values of $\text{delay}_{(H-UPF-NW-TT, V-UPF)}$ and $\text{delay}_{(V-UPF, RAN)}$ may be obtained through static configuration of the 5G system or internal measurement of the 5G system. The value $\text{offset}_{(TSN, VPLMN)}$ represents a time difference between the system clock of the TSN DN and a system clock of a VPLMN.

The value $\text{offset}_{(TSN, VPLMN)}$ is determined in a plurality of manners, and for example, may be measured by a V-SMF. Alternatively, $\text{offset}_{(TSN, VPLMN)}$ may be measured by the V-UPF and reported to the V-SMF. Alternatively, $\text{offset}_{(TSN, VPLMN)}$ may be a sum of $\text{offset}_{(TSN, HPLMN)}$ and $\text{offset}_{(HPLMN, VPLMN)}$. The value $\text{offset}_{(TSN, HPLMN)}$ represents a time difference between the system clock of the TSN DN and a system clock of an HPLMN, and may be measured by an H-SMF or measured by an H-UPF and reported to the H-SMF. The value $\text{offset}_{(HPLMN, VPLMN)}$ represents a time difference between a system clock of the HPLMN and the system clock of the VPLMN, and may be measured by the V-SMF or measured by the V-UPF and reported to the V-SMF, or measured by the H-SMF or measured by the H-UPF and reported to the H-SMF.

For the uplink, the burst arrival time in the TSC service may be time when data arrives at UE from a DS-TT. Specifically, the burst arrival time may be determined according to the following formula (3):

$$T_{UL} = T_2 + \text{offset}_{(TSN,PLMN)} + \text{delay}_{(DS-TT,UE)} \qquad \text{formula (3)}$$

where $T_2$ represents time when data arrives at the DS-TT, and is uplink "burst arrival time" provided by the AF to the SMF; and $\text{offset}_{(TSN, PLMN)}$ represents a time difference between the system clock of the TSN DN and the system clock of the PLMN, and may be measured by the SMF or measured by the UPF and reported to the SMF, and $\text{delay}_{(DS-TT, UE)}$ represents a transmission delay from the DS-TT to the UE, and a value of $\text{delay}_{(DS-TT, UE)}$ may be obtained through the static configuration of the 5G system or the internal measurement of the 5G system.

In a scenario in which a terminal is roaming, the formula (3) may be modified into the following formula (4):

$$T_{UL} = T_2 + \text{offset}_{(TSN,VPLMN)} + \text{delay}_{(DS-TT,UE)} \qquad \text{formula (4)}$$

Formula (4) is similar to formula (3), where the manner of determining $\text{offset}_{(TSN, VPLMN)}$ is described in the part about formula (3), and details are not described herein again.

In the embodiments of the present disclosure, the V-UPF and/or H-UPF used for measuring and/or reporting the time difference and described above may be a UPF specially used for measuring and/or reporting the time difference. That is, the V-UPF and/or H-UPF used for measuring and/or reporting the time difference may be independent of a user plane network node participating in a PDU session of home routed roaming of TSN communication. For example, the V-UPF and/or H-UPF used for measuring and/or reporting the time difference may be independent of the UPF in the PDU session in which the UE participates in the TSN communication. Alternatively, the V-UPF and/or H-UPF used for measuring and/or reporting the time difference may be the user plane network node participating in the PDU session of the home routed roaming of the TSN communication. For example, the V-UPF and/or H-UPF used for measuring and/or reporting the time difference may be the UPF in the PDU session in which the UE participates in the TSN communication. The UPF may be used to not only perform a PDU session, but also measure and/or report the time difference.

In addition, the time difference between the system clock of the TSN DN and the system clock of the HPLMN, and/or the time difference between the system clock of the TSN DN and the system clock of the VPLMN, and/or the time difference between system clock of the VPLMN and the system clock of the HPLMN described above may be implemented by using a method or an algorithm defined by the standard IEEE 1588 or IEEE 802.1AS and used for measuring the time difference between the system clocks of the different networks.

Through the description of the "time parameter" in step S203, in the foregoing step S203, that the visited-control plane network node determines the time parameter according to the second information may specifically include that the visited-control plane network node determines "burst arrival time" in the time parameter according to the second information. That is, the visited-control plane network node may determine, according to the second information, the time parameter determining manner to be used by the visited-control plane network node, and then determine the "burst arrival time" in the time parameter by using the determined time parameter determining manner.

A schematic process that the visited-control plane network node determines the "burst arrival time" in the time parameter by using the determined time parameter determining manner is described in detail in the following. In the following, for convenience, the time parameter determined by the visited-control plane network node by using the determined time parameter determining manner is referred to as a "second time parameter".

According to a first example of the present disclosure, when the second information indicates that the time parameter determining manner to be used by the visited-control plane network node is the first determining manner, the visited-control plane network node may determine the "burst arrival time" in the time parameter by using the first determining manner.

Specifically, in the first example, the visited-control plane network node may receive a first time parameter from a home-control plane network node, the first time parameter being a time parameter based on a system clock of a network to which the home-control plane network node belongs. Subsequently, the visited-control plane network node may determine the second time parameter at least according to the first time parameter, the second time parameter being a time parameter based on a system clock of a network to which the visited-control plane network node belongs. For example, the visited-control plane network node may determine the second time parameter according to the first time parameter and a time difference between the system clock of the network to which the home-control plane network node belongs and the system clock of the network to which the visited-control plane network node belongs.

For example, in the first example, the visited-control plane network node may receive, from the home-control plane network node, TSCAI based on the system clock of the network (that is, an HPLMN) to which the home-control plane network node belongs, "burst arrival time" in the TSCAI being based on the system clock of the network (that is, the HPLMN) to which the home-control plane network node belongs. Subsequently, the visited-control plane network node may modify, according to the TSCAI provided by the home-control plane network node and a time difference $\text{offset}_{(HPLMN, VPLMN)}$ between the system clock of the network (that is, the HPLMN) to which the home-control plane network node belongs and the system clock of the network (that is, the VPLMN) to which the visited-control plane network node belongs by using the foregoing formula (2) or (4), the "burst arrival time" in the TSCAI provided by the home-control plane network node, to obtain "burst arrival time" in the TSCAI based on the system clock of the network (that is, the VPLMN) to which the visited-control plane network node belongs. The "burst arrival time" in the TSCAI based on the system clock of the network (that is, the VPLMN) to which the visited-control plane network node belongs is based on the system clock of the network (that is, the VPLMN) to which the visited-control plane network node belongs.

According to a second example of the present disclosure, when the second information indicates that the time parameter determining manner to be used by the visited-control plane network node is the second determining manner, the visited-control plane network node may determine the "burst arrival time" in the time parameter by using the second determining manner.

Specifically, in the second example, the visited-control plane network node may receive the second time parameter from the home-control plane network node, the second time parameter being a time parameter based on a system clock of a network to which the visited-control plane network node belongs.

For example, in the second example, the visited-control plane network node may receive, from the home-control plane network node, TSCAI based on the system clock of the network (that is, a VPLMN) to which the visited-control plane network node belongs, "burst arrival time" in the TSCAI being based on the system clock of the network (that is, the VPLMN) to which the visited-control plane network node belongs. That is, the home-control plane network node has modified the TSCAI based on the system clock of the network (that is, the HPLMN) to which the home-control plane network node belongs into the TSCAI based on the system clock of the network (that is, the VPLMN) to which the visited-control plane network node belongs. Therefore, the visited-control plane network node may directly obtain, without the need to perform a modification operation, the TSCAI based on the system clock of the network (that is, the VPLMN) to which the visited-control plane network node belongs.

According to a third example of the present disclosure, when the second information indicates that the time parameter determining manner to be used by the visited-control plane network node is the third determining manner, the visited-control plane network node may determine the "burst arrival time" in the time parameter by using the third determining manner.

Specifically, in the third example, the visited-control plane network node may receive a third time parameter from the home-control plane network node, the third time parameter being a time parameter based on a system clock of an external network of the network to which the home-control plane network node belongs. Subsequently, the visited-control plane network node may determine the second time parameter at least according to the third time parameter, the second time parameter being a time parameter based on the system clock of the network to which the visited-control plane network node belongs. For example, the visited-control plane network node may determine the second time parameter according to the third time parameter and a time difference between the system clock of the external network of the network to which the home-control plane network node belongs and the system clock of the network to which the visited-control plane network node belongs.

For example, in the third example, the visited-control plane network node may receive, from the home-control plane network node, TSCAI based on the system clock of the external network (that is, a TSN DN) of the network to which the home-control plane network node belongs, "burst arrival time" in the TSCAI being based on the system clock of the external network (that is, the TSN DN) of the network to which the home-control plane network node belongs. Subsequently, the visited-control plane network node may modify, according to the TSCAI provided by the home-control plane network node and a time difference offset$_{(TSN, VPLMN)}$ between the system clock of the external network (that is, the TSN DN) of the network to which the home-control plane network node belongs and the system clock of the network (that is, the VPLMN) to which the visited-control plane network node belongs by using the foregoing formula (2) or (4), the "burst arrival time" in the TSCAI provided by the home-control plane network node, to obtain "burst arrival time" in the TSCAI based on the system clock of the network (that is, the VPLMN) to which the visited-control plane network node belongs. The "burst arrival time" in the TSCAI based on the system clock of the network (that is, the VPLMN) to which the visited-control plane network node belongs is based on the system clock of the network (that is, the VPLMN) to which the visited-control plane network node belongs.

According to the clock synchronization method performed by the visited-control plane network node of this embodiment, the visited-control plane network node may transmit information used for indicating a time parameter determining manner supported by the visited-control plane network node to the home-control plane network node, and receive, from the home-control plane network node, information used for indicating a time parameter determining manner to be used by the visited-control plane network node, so that the time parameter determining manner to be used by the visited-control plane network node is controlled by the home-control plane network node, and the visited-control plane network node determines a time parameter according to the time parameter determining manner, to provide an accurate time parameter to a RAN. In this way, a problem of inaccurate "burst arrival time" in TSCAI due to clock skew caused by a time difference between a VPLMN and an HPLMN or different master clocks used by the VPLMN and the HPLMN even if the VPLMN and the HPLMN are in the same time zone is avoided.

Figure 4:
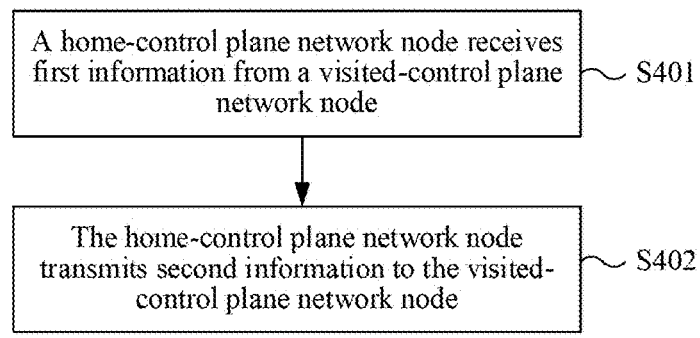
FIG. 4 is a flowchart of another clock synchronization method according to an embodiment of the present disclosure.

FIG. 4 describes a clock synchronization method according to an embodiment of the present disclosure below. The method is performed by a home-control plane network node. FIG. 4 is a flowchart of a clock synchronization method 400 according to an embodiment of the present disclosure. Because specific details of the following operations performed according to the method 400 are the same as those described above with reference to FIG. 2, the repeated description of the same detail is omitted herein to avoid repetition.

As shown in FIG. 4, in step S401, the home-control plane network node receives first information from a visited-control plane network node, the first information indicating a time parameter determining manner supported by the visited-control plane network node.

In this embodiment of the present disclosure, there may be one or more time parameter determining manners supported by the visited-control plane network node. For example, there may be three time parameter determining manners supported by the visited-control plane network node, namely, a first determining manner, a second determining manner, and a third determining manner. Specifically, the first determining manner may mean that the visited-control plane network node determines a time parameter partially with the help of the home-control plane network node, the second determining manner may mean that the visited-control plane network node determines a time parameter completely with the help of the home-control plane network node, and the third determining manner may mean that the visited-control plane network node determines a time parameter without the help of the home-control plane network node.

Then, in step S402, the home-control plane network node transmits second information to the visited-control plane network node, the second information indicating a time parameter determining manner to be used by the visited-control plane network node. For example, the home-control plane network node may determine, according to the first information in step S401, time parameter determining manners supported by the visited-control plane network node, and select one of the time parameter determining manners supported by the visited-control plane network node as the time parameter determining manner to be used by the visited-control plane network node. Then, the home-control plane network node may notify the visited-control plane network node through the second information in step S402.

The "time parameter" described herein may be TSCAI based on the system clock of the network (that is, the VPLMN) to which the visited-control plane network node belongs. The TSCAI may include one or more of information indicating a direction of a TSC service (for example, an uplink or a downlink), transmission period of data in the TSC service, burst arrival time in the TSC service, and the like. In the following, for convenience, the time parameter determined by the visited-control plane network node by using the determined time parameter determining manner is referred to as a "second time parameter".

According to the first example of the present disclosure, when the second information indicates that the time parameter determining manner to be used by the visited-control plane network node is the first determining manner, the home-control plane network node may transmit a first time parameter to the visited-control plane network node, the first time parameter being a time parameter based on a system clock of a network to which the home-control plane network node belongs. Correspondingly, the visited-control plane network node determines the second time parameter at least according to the first time parameter, the second time parameter being a time parameter based on a system clock of a network to which the visited-control plane network node belongs. For example, the visited-control plane network node may determine the second time parameter according to the first time parameter and a time difference between the system clock of the network to which the home-control plane network node belongs and the system clock of the network to which the visited-control plane network node belongs.

For example, in the first example, the home-control plane network node may transmit the TSCAI based on the system clock of the network (that is, the HPLMN) to which the home-control plane network node belongs to the visited-control plane network node, the "burst arrival time" in the TSCAI being based on the system clock of the network (that is, the HPLMN) to which the home-control plane network node belongs. Subsequently, the visited-control plane network node may modify, according to the TSCAI provided by the home-control plane network node and a time difference offset$_{(HPLMN, VPLMN)}$ between the system clock of the network (that is, the HPLMN) to which the home-control plane network node belongs and the system clock of the network (that is, the VPLMN) to which the visited-control plane network node belongs by using the foregoing formula (2) or (4), the "burst arrival time" in the TSCAI provided by the home-control plane network node, to obtain "burst arrival time" in the TSCAI based on the system clock of the network (that is, the VPLMN) to which the visited-control plane network node belongs. The "burst arrival time" in the TSCAI based on the system clock of the network (that is, the VPLMN) to which the visited-control plane network node belongs is based on the system clock of the network (that is, the VPLMN) to which the visited-control plane network node belongs.

In this example, the TSCAI based on the system clock of the network (that is, the HPLMN) to which the home-control plane network node belongs transmitted by the home-control plane network node to the visited-control plane network node may be determined according to TSCAI based on a system clock of an external network (that is, a TSN DN) of the network to which the home-control plane network node belongs, and a time difference between the system clock of the external network (that is, the TSN DN) of the network to which the home-control plane network node belongs and the system clock of the network (that is, the HPLMN) to which the home-control plane network node belongs.

According to the second example of the present disclosure, when the second information indicates that the time parameter determining manner to be used by the visited-control plane network node is the second determining manner, the home-control plane network node may transmit the second time parameter to the visited-control plane network node, the second time parameter being a time parameter based on the system clock of the network to which the visited-control plane network node belongs.

For example, in the second example, the home-control plane network node may transmit the TSCAI based on the system clock of the network (that is, the VPLMN) to which the visited-control plane network node belongs to the visited-control plane network node, the "burst arrival time" in the TSCAI being based on the system clock of the network (that is, the VPLMN) to which the visited-control plane network node belongs. That is, the home-control plane network node has modified the TSCAI based on the system clock of the network (that is, the HPLMN) to which the home-control plane network node belongs into the TSCAI based on the system clock of the network (that is, the VPLMN) to which the visited-control plane network node belongs. Therefore, the visited-control plane network node may directly obtain, without the need to perform a modification operation, the TSCAI based on the system clock of the network (that is, the VPLMN) to which the visited-control plane network node belongs.

In this example, the TSCAI based on the system clock of the network (that is, the VPLMN) to which the visited-control plane network node belongs transmitted by the home-control plane network node to the visited-control plane network node may be determined according to the TSCAI based on the system clock of the external network (that is, the TSN DN) of the network to which the home-control plane network node belongs, the time difference between the system clock of the external network (that is, the TSN DN) of the network to which the home-control plane network node belongs and the system clock of the network (that is, the HPLMN) to which the home-control plane network node belongs, and a time difference between the system clock of the network (that is, the HPLMN) to which the home-control plane network node belongs and the system clock of the network (that is, the VPLMN) to which the visited-control plane network node belongs.

According to the third example of the present disclosure, when the second information indicates that the time parameter determining manner to be used by the visited-control plane network node is the third determining manner, the home-control plane network node may transmit the third time parameter to the visited-control plane network node, the third time parameter being a time parameter based on the system clock of the external network of the network to which the home-control plane network node belongs. Correspondingly, the visited-control plane network node may determine the second time parameter at least according to the third time parameter, the second time parameter being a time parameter based on the system clock of the network to which the visited-control plane network node belongs. For example, the visited-control plane network node may determine the second time parameter according to the third time parameter and a time difference between the system clock of the external network of the network to which the home-control plane network node belongs and the system clock of the network to which the visited-control plane network node belongs.

For example, in the third example, the home-control plane network node may transmit the TSCAI based on the system clock of the external network (that is, the TSN DN) of the network to which the home-control plane network node belongs to the visited-control plane network node, the "burst arrival time" in the TSCAI being based on the system clock of the external network (that is, the TSN DN) of the network to which the home-control plane network node belongs. Subsequently, the visited-control plane network node may modify, according to the TSCAI provided by the home-control plane network node and a time difference offset$_{(TSN, VPLMN)}$ between the system clock of the external network (that is, the TSN DN) of the network to which the home-control plane network node belongs and the system clock of the network (that is, the VPLMN) to which the visited-control plane network node belongs by using the foregoing formula (2) or (4), the "burst arrival time" in the TSCAI provided by the home-control plane network node, to obtain "burst arrival time" in the TSCAI based on the system clock of the network (that is, the VPLMN) to which the visited-control plane network node belongs. The "burst arrival time" in the TSCAI based on the system clock of the network (that is, the VPLMN) to which the visited-control plane network node belongs is based on the system clock of the network (that is, the VPLMN) to which the visited-control plane network node belongs.

According to the clock synchronization method performed by the home-control plane network node of this embodiment, the home-control plane network node may receive, from the visited-control plane network node, information used for indicating a time parameter determining manner supported by the visited-control plane network node, and transmit information used for indicating a time parameter determining manner to be used by the visited-control plane network node to the visited-control plane network node, so that the time parameter determining manner to be used by the visited-control plane network node is controlled by the home-control plane network node, and the visited-control plane network node determines a time parameter according to the time parameter determining manner, to provide an accurate time parameter to a RAN. In this way, a problem of inaccurate "burst arrival time" in TSCAI due to clock skew caused by a time difference between a VPLMN and an HPLMN or different master clocks used by the VPLMN and the HPLMN even if the VPLMN and the HPLMN are in the same time zone is avoided.

Figure 5:
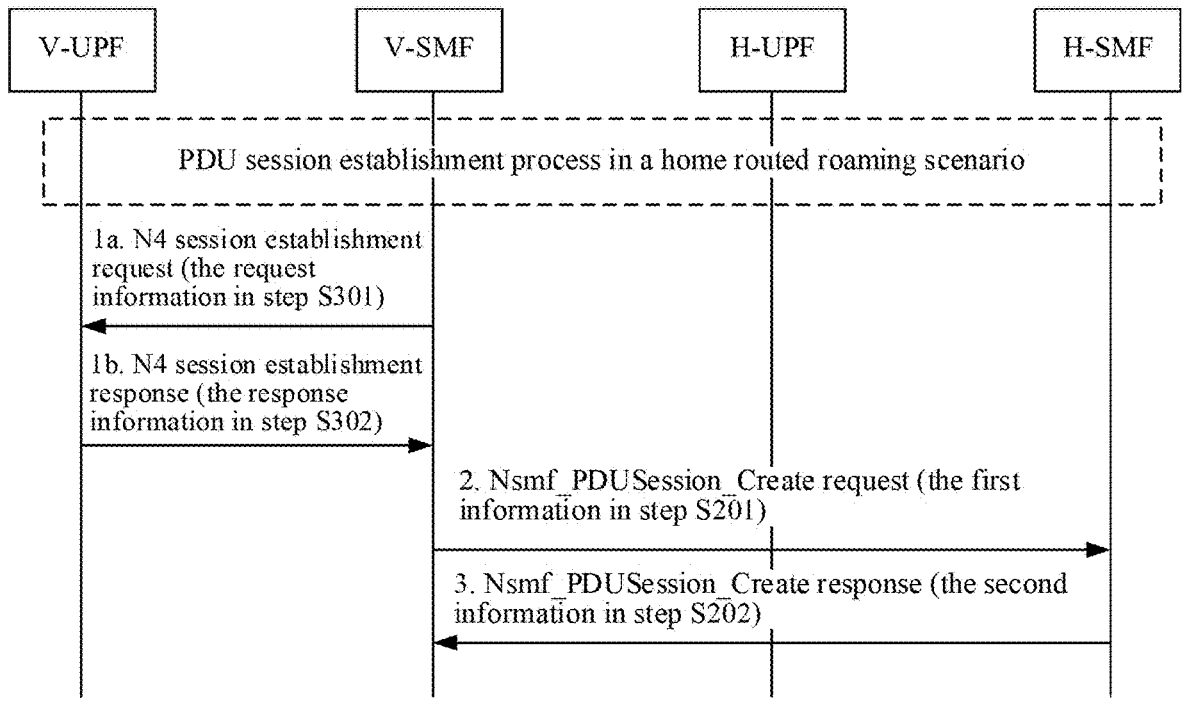
FIG. 5 is a schematic flowchart of a clock synchronization method in a wireless TSC system according to an embodiment of the present disclosure.

A specific process of a clock synchronization method in a wireless TSC system is described below with reference to FIG. 5. FIG. 5 is a schematic flowchart of a clock synchronization method in a wireless TSC system according to an embodiment of the present disclosure. An example shown in FIG. 5 is based on a PDU session establishment process in a UE home routed roaming scenario.

As shown in FIG. 5, in step 1a, a V-SMF may transmit an N4 session establishment request to a V-UPF through an N4 interface, the N4 session establishment request may include the request information in step S301 in the foregoing method 300, and the request information may be used for requesting the V-UPF to feed back, to the V-SMF, a measurement capability of the V-UPF to a time difference between system clocks of different networks.

Subsequently, in step 1b, the V-UPF may transmit an N4 session establishment response to the V-SMF through the N4 interface, the N4 session establishment response may include the response information in step S302 in the foregoing method 300, and the response information may indicate the measurement capability of the V-UPF to the time difference between the system clocks of the different networks.

Then, in step 2, the V-SMF may transmit an Nsmf_PDUSession_Create request to an H-SMF through an Nsmf interface, the Nsmf_PDUSession_Create request may include the first information in step S201 in the foregoing method 200, and the first information may indicate a time parameter determining manner supported by the V-SMF.

Then, in step 3, the H-SMF may transmit an Nsmf_PDUSession_Create response to the V-SMF through the Nsmf interface, the Nsmf_PDUSession_Create response may include the second information in step S202 in the foregoing method 200, and the second information may indicate the time parameter determining manner determined by the H-SMF for the V-SMF.

The example shown in FIG. 5 may further include other steps. The 3GPP standard specification has defined the steps, and the steps are irrelevant to inventive content of the embodiments of the present disclosure. Therefore, details are not described herein again.

Figure 6:
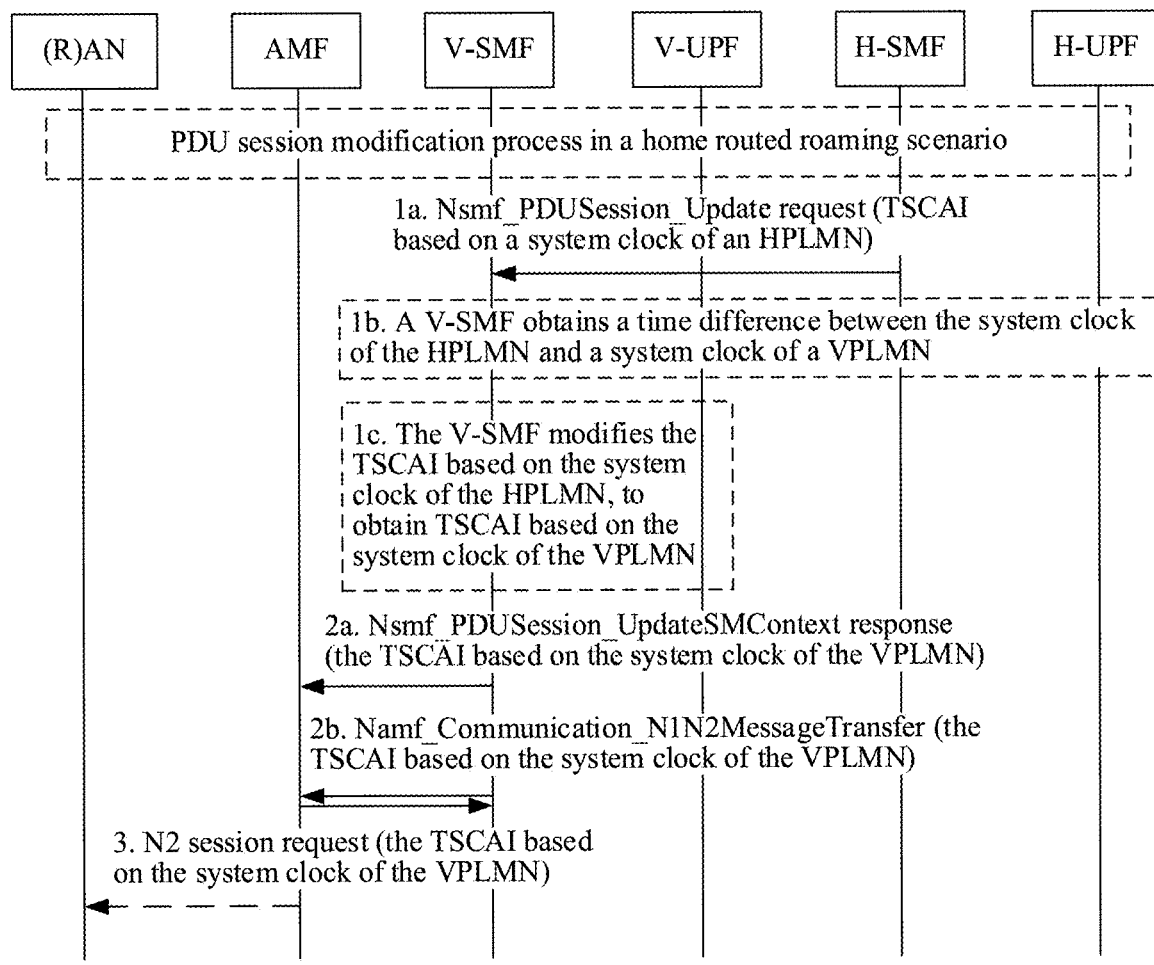
FIG. 6 is a schematic flowchart of determining a time parameter according to a first determining manner in a wireless TSC system according to an embodiment of the present disclosure.

A specific process of determining a time parameter according to a first determining manner in a wireless TSC system is described below with reference to FIG. 6 and FIG. 7. FIG. 6 is a schematic flowchart of determining a time parameter according to a first determining manner in a wireless TSC system according to an embodiment of the present disclosure. An example shown in FIG. 6 is based on a PDU session modification process in a UE home routed roaming scenario. The PDU session modification process may be initiated by UE, or by an SMF, or by a PCF, or the like.

As shown in FIG. 6, in step 1a, an H-SMF may transmit an Nsmf_PDUSession_Update request to a V-SMF through an Nsmf interface, and the Nsmf_PDUSession_Update request includes TSCAI based on a system clock of an HPLMN, "burst arrival time" in the TSCAI being based on the system clock of the HPLMN.

In step 1b, the V-SMF obtains a time difference offset$_{(HPLMN, VPLMN)}$ between the system clock of the HPLMN and a system clock of a VPLMN. For example, as described above with reference to formula (2), offset$_{(HPLMN, VPLMN)}$ may be measured by the V-SMF or measured by a V-UPF and reported to the V-SMF. Alternatively, offset$_{(HPLMN, VPLMN)}$ may be measured by the H-SMF or measured by an H-UPF and reported to the H-SMF, and then the H-SMF may notify offset$_{(HPLMN, VPLMN)}$ to the V-SMF.

A sequence of performing step 1a and step 1b is not limited in the embodiments of the present disclosure. For example, step 1a and step 1b may be performed simultaneously, or step 1a may be performed before step 1b, or step 1b may be performed before step 1a.

Then, in step 1c, the V-SMF may modify the TSCAI based on the system clock of the HPLMN into TSCAI based on the system clock of the VPLMN. For example, according to the first example described above, the V-SMF may modify, by using the formula (2) or formula (4), the TSCAI based on the system clock of the HPLMN into the TSCAI based on the system clock of the VPLMN according to the TSCAI based on the system clock of the HPLMN and the time difference offset$_{(HPLMN, VPLMN)}$ that is between the system clock of the HPLMN and the system clock of the VPLMN and that is obtained through step 1b. The "burst arrival time" in the modified TSCAI is based on the system clock of the VPLMN.

Subsequently, in step 2a, the V-SMF may transmit an Nsmf_PDUSession_UpdateSMContext response to an AMF through the Nsmf interface, the Nsmf_PDUSession_UpdateSMContext response including the TSCAI based on the system clock of the VPLMN. Alternatively, in step 2b, the AMF and the V-SMF may transmit Namf_Communication_NIN2MessageTransfer through an Namf interface, the Namf_Communication_NIN2Message Transfer including the TSCAI based on the system clock of the VPLMN.

Then, in step 3, the AMF transmits an N2 session request to a (R)AN through an N2 interface, the N2 session request including the TSCAI based on the system clock of the VPLMN.

The example shown in FIG. 6 may further include other steps. The 3GPP standard specification has defined the steps, and the steps are irrelevant to inventive content of the embodiments of the present disclosure. Therefore, details are not described herein again.

Figure 7:
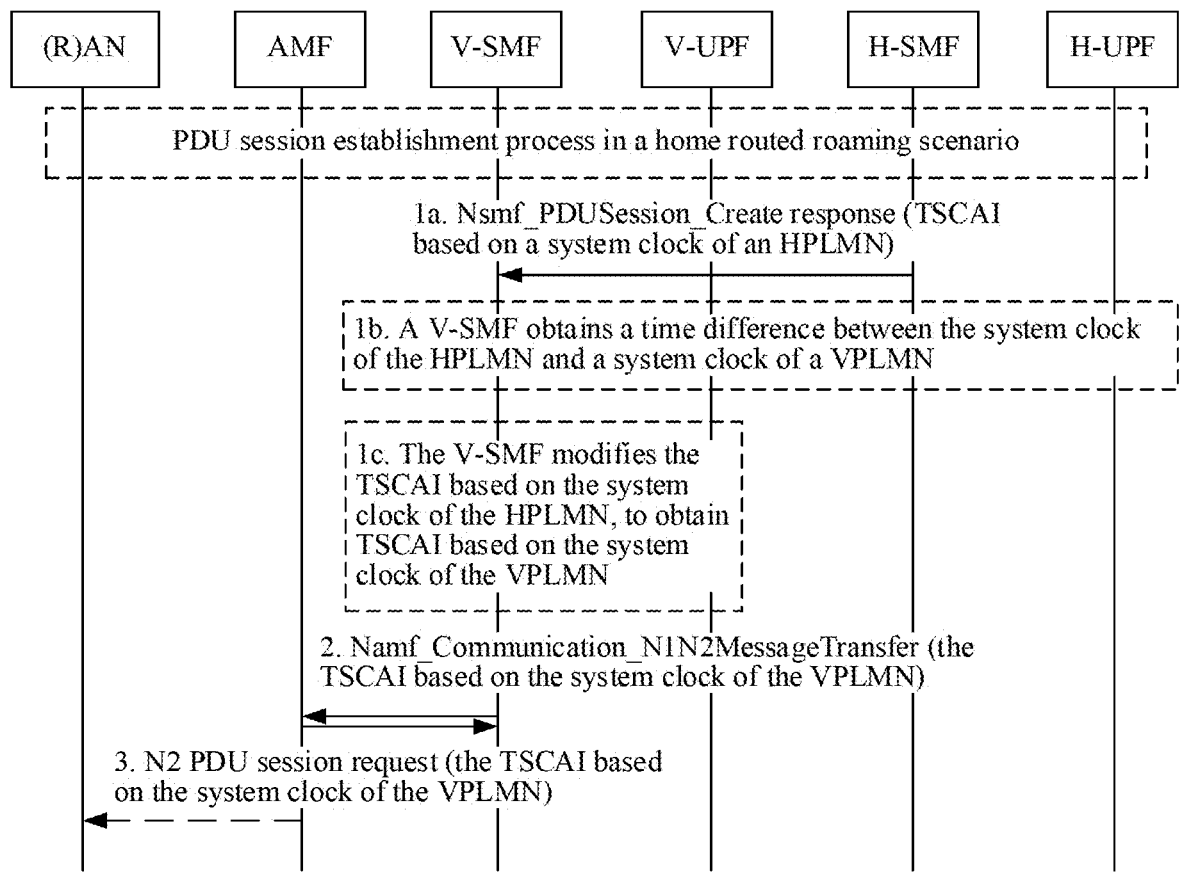
FIG. 7 is another schematic flowchart of determining a time parameter according to a first determining manner in a wireless TSC system according to an embodiment of the present disclosure.

FIG. 7 is another schematic flowchart of determining a time parameter according to a first determining manner in a wireless TSC system according to an embodiment of the present disclosure. An example shown in FIG. 7 is based on a PDU session establishment process in a UE home routed roaming scenario.

As shown in FIG. 7, in step 1a, an H-SMF may transmit an Nsmf_PDUSession_Create response to a V-SMF through an Nsmf interface, and the Nsmf_PDUSession_Create response includes TSCAI based on a system clock of an HPLMN, "burst arrival time" in the TSCAI being based on the system clock of the HPLMN.

In step 1b, the V-SMF obtains a time difference offset$_{(HPLMN, VPLMN)}$ between the system clock of the HPLMN and a system clock of a VPLMN. For example, as described above with reference to formula (2), offset$_{(HPLMN, VPLMN)}$ may be measured by the V-SMF or measured by a V-UPF and reported to the V-SMF. Alternatively, offset$_{(HPLMN, VPLMN)}$ may be measured by the H-SMF or measured by an H-UPF and reported to the H-SMF, and then the H-SMF may notify offset$_{(HPLMN, VPLMN)}$ to the V-SMF.

A sequence of performing step 1a and step 1b is not limited in the embodiments of the present disclosure. For example, step 1a and step 1b may be performed simultaneously, or step 1a may be performed before step 1b, or step 1b may be performed before step 1a.

Then, in step 1c, the V-SMF may modify the TSCAI based on the system clock of the HPLMN into TSCAI based on the system clock of the VPLMN. For example, according to the first example described above, the V-SMF may modify, by using the formula (2) or formula (4), the TSCAI based on the system clock of the HPLMN into the TSCAI based on the system clock of the VPLMN according to the TSCAI based on the system clock of the HPLMN and the time difference offset$_{(HPLMN, VPLMN)}$ that is between the system clock of the HPLMN and the system clock of the VPLMN and that is obtained through step 1b. The "burst arrival time" in the modified TSCAI is based on the system clock of the VPLMN.

Subsequently, in step 2, the AMF and the V-SMF may transmit Namf_Communication_NIN2MessageTransfer through an Namf interface, the Namf_Communication_NIN2Message Transfer including the TSCAI based on the system clock of the VPLMN.

Then, in step 3, the AMF transmits an N2 PDU session request to a (R)AN through an N2 interface, the N2 PDU session request including the TSCAI based on the system clock of the VPLMN.

The example shown in FIG. 7 may further include other steps. The 3GPP standard specification has defined the steps, and the steps are irrelevant to inventive content of the embodiments of the present disclosure. Therefore, details are not described herein again.

Figure 8:
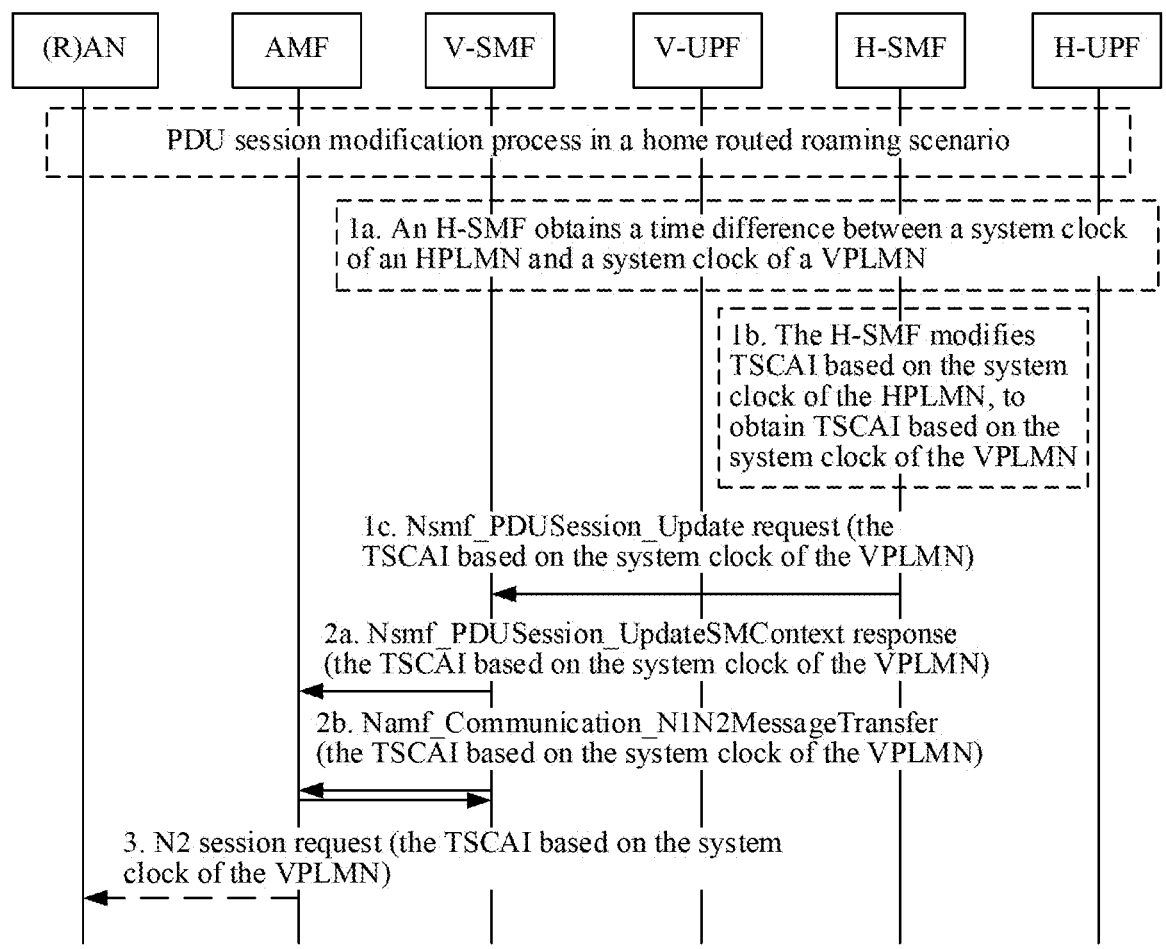
FIG. 8 is a schematic flowchart of determining a time parameter according to a second determining manner in a wireless TSC system according to an embodiment of the present disclosure.

A specific process of determining a time parameter according to a second determining manner in a wireless TSC system is described below with reference to FIG. 8 and FIG. 9. FIG. 8 is a schematic flowchart of determining a time parameter according to a second determining manner in a wireless TSC system according to an embodiment of the present disclosure. An example shown in FIG. 8 is based on a PDU session modification process in a UE home routed roaming scenario.

As shown in FIG. 8, in step 1a, an H-SMF obtains a time difference offset$_{(HPLMN, VPLMN)}$ between a system clock of an HPLMN and a system clock of a VPLMN. For example, as described above with reference to formula (2), offset$_{(HPLMN, VPLMN)}$ may be measured by the H-SMF or measured by an H-UPF and reported to the H-SMF. Alternatively, offset$_{(HPLMN, VPLMN)}$ may be measured by a V-SMF or measured by a V-UPF and reported to the V-SMF, and then the V-SMF may notify offset$_{(HPLMN, VPLMN)}$ to the H-SMF.

Then, in step 1b, the H-SMF may modify TSCAI based on the system clock of the HPLMN into TSCAI based on the system clock of the VPLMN. For example, according to the second example described above, the H-SMF may modify, by using the formula (2) or formula (4), the TSCAI based on the system clock of the HPLMN into the TSCAI based on the system clock of the VPLMN according to the TSCAI based on the system clock of the HPLMN and the time difference offset$_{(HPLMN, VPLMN)}$ that is between the system clock of the HPLMN and the system clock of the VPLMN and that is obtained through step 1a. The "burst arrival time" in the modified TSCAI is based on the system clock of the VPLMN.

Then, in step 1c, the H-SMF may transmit an Nsmf_PDUSession_Update request to a V-SMF through an Nsmf interface, and the Nsmf_PDUSession_Update request includes the TSCAI based on the system clock of the VPLMN, "burst arrival time" in the TSCAI being based on the system clock of the VPLMN.

Because the "burst arrival time" in the TSCAI in step 1c has been based on the system clock of the VPLMN, the V-SMF does not need to continuously perform time adjustment as shown in FIG. 6 or FIG. 7, and may directly transmit the TSCAI to a (R)AN. That is, in step 2a, the V-SMF may transmit an Nsmf_PDUSession_UpdateSMContext response to an AMF through the Nsmf interface, the Nsmf_PDUSession_UpdateSMContext response including the TSCAI based on the system clock of the VPLMN. Alternatively, in step 2b, the AMF and the V-SMF may transmit Namf_Communication_NIN2Message Transfer through an Namf interface, the Namf_Communication_NIN2MessageTransfer including the TSCAI based on the system clock of the VPLMN.

Then, in step 3, the AMF transmits an N2 session request to a (R)AN through an N2 interface, the N2 session request including the TSCAI based on the system clock of the VPLMN.

The example shown in FIG. 8 may further include other steps. The 3GPP standard specification has defined the steps, and the steps are irrelevant to inventive content of the embodiments of the present disclosure. Therefore, details are not described herein again.

Figure 9:
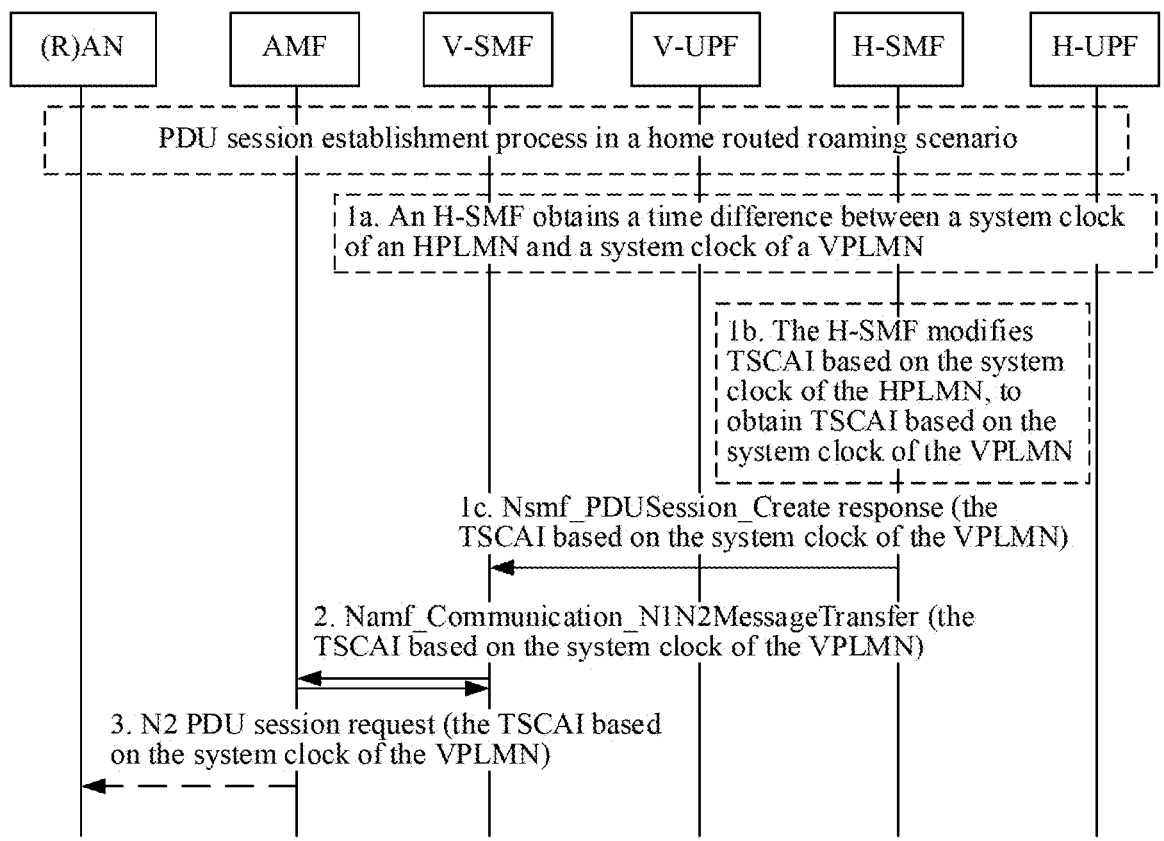
FIG. 9 is another schematic flowchart of determining a time parameter according to a second determining manner in a wireless TSC system according to an embodiment of the present disclosure.

FIG. 9 is another schematic flowchart of determining a time parameter according to a second determining manner in a wireless TSC system according to an embodiment of the present disclosure. An example shown in FIG. 9 is based on a PDU session establishment process in a UE home routed roaming scenario.

As shown in FIG. 9, in step 1a, an H-SMF obtains a time difference offset$_{(HPLMN,\ VPLMN)}$ between a system clock of an HPLMN and a system clock of a VPLMN. For example, as described above with reference to formula (2), offset$_{(HPLMN,\ VPLMN)}$ may be measured by the H-SMF or measured by an H-UPF and reported to the H-SMF. Alternatively, offset$_{(HPLMN,\ VPLMN)}$ may be measured by a V-SMF or measured by a V-UPF and reported to the V-SMF, and then the V-SMF may notify offset$_{(HPLMN,\ VPLMN)}$ to the H-SMF.

Then, in step 1b, the H-SMF may modify TSCAI based on the system clock of the HPLMN into TSCAI based on the system clock of the VPLMN. For example, according to the second example described above, the H-SMF may modify, by using the formula (2) or formula (4), the TSCAI based on the system clock of the HPLMN into the TSCAI based on the system clock of the VPLMN according to the TSCAI based on the system clock of the HPLMN and the time difference offset$_{(HPLMN,\ VPLMN)}$ that is between the system clock of the HPLMN and the system clock of the VPLMN and that is obtained through step 1a. The "burst arrival time" in the modified TSCAI is based on the system clock of the VPLMN.

Then, in step 1c, the H-SMF may transmit an Nsmf_PDUSession_Create response to the V-SMF through an Nsmf interface, and the Nsmf_PDUSession_Create response includes the TSCAI based on the system clock of the VPLMN, "burst arrival time" in the TSCAI being based on the system clock of the VPLMN.

Because the "burst arrival time" in the TSCAI in step 1c has been based on the system clock of the VPLMN, the V-SMF does not need to continuously perform time adjustment as shown in FIG. 6 or FIG. 7, and may directly transmit the TSCAI to a (R)AN. That is, in step 2, the AMF and the V-SMF may transmit Namf_Communication_NIN2MessageTransfer through an Namf interface, the Namf_Communication_NIN2MessageTransfer including the TSCAI based on the system clock of the VPLMN.

Then, in step 3, the AMF transmits an N2 PDU session request to a (R)AN through an N2 interface, the N2 PDU session request including the TSCAI based on the system clock of the VPLMN.

The example shown in FIG. 9 may further include other steps. The 3GPP standard specification has defined the steps, and the steps are irrelevant to inventive content of the embodiments of the present disclosure. Therefore, details are not described herein again.

Figure 10:
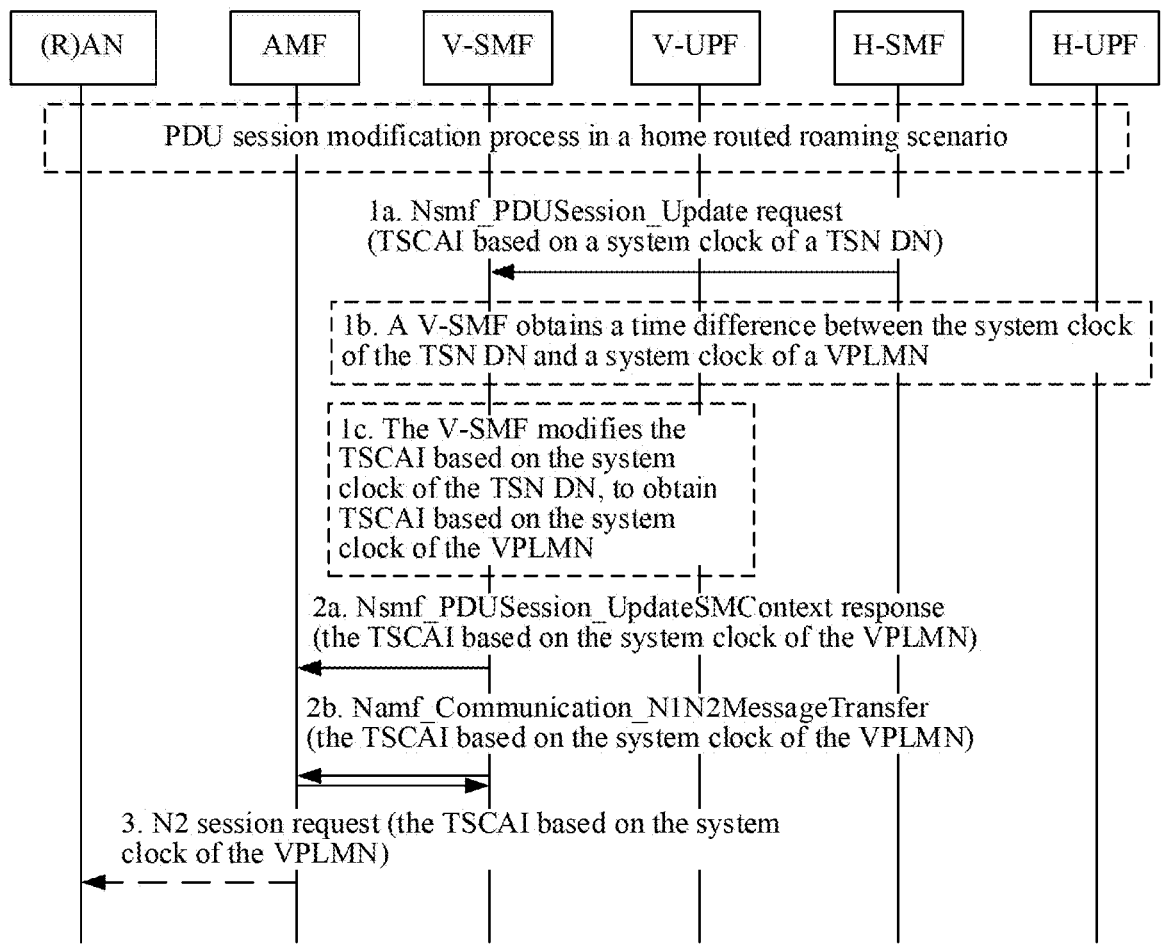
FIG. 10 is a schematic flowchart of determining a time parameter according to a third determining manner in a wireless TSC system according to an embodiment of the present disclosure.

A specific process of determining a time parameter according to a third determining manner in a wireless TSC system is described below with reference to FIG. 10 and FIG. 11. FIG. 10 is a schematic flowchart of determining a time parameter according to a third determining manner in a wireless TSC system according to an embodiment of the present disclosure. An example shown in FIG. 10 is based on a PDU session modification process in a UE home routed roaming scenario.

As shown in FIG. 10, in step 1a, an H-SMF may transmit an Nsmf_PDUSession_Update request to a V-SMF through an Nsmf interface, and the Nsmf_PDUSession_Update request includes TSCAI based on a system clock of a TSN DN, "burst arrival time" in the TSCAI being based on the system clock of the TSN DN.

In step 1b, the V-SMF obtains a time difference offset$_{(TSN,\ VPLMN)}$ between the system clock of the TSN DN and a system clock of a VPLMN. For example, as described above with reference to formula (2), offset$_{(TSN,\ VPLMN)}$ may be measured by the V-SMF or measured by a V-UPF and reported to the V-SMF.

A sequence of performing step 1a and step 1b is not limited in the embodiments of the present disclosure. For example, step 1a and step 1b may be performed simultaneously, or step 1a may be performed before step 1b, or step 1b may be performed before step 1a.

Then, in step 1c, the V-SMF may modify the TSCAI based on the system clock of the TSN DN into TSCAI based on the system clock of the VPLMN. For example, according to the third example described above, the V-SMF may modify, by using the formula (2) or formula (4), the TSCAI based on the system clock of the TSN DN into the TSCAI based on the system clock of the VPLMN according to the TSCAI based on the system clock of the TSN DN and the time difference offset$_{(TSN,\ VPLMN)}$ that is between the system clock of the TSN DN and the system clock of the VPLMN and that is obtained through step 1b. The "burst arrival time" in the modified TSCAI is based on the system clock of the VPLMN.

Subsequently, in step 2a, the V-SMF may transmit an Nsmf_PDUSession_UpdateSMContext response to an AMF through the Nsmf interface, the Nsmf_PDUSession_UpdateSMContext response including the TSCAI based on the system clock of the VPLMN. Alternatively, in step 2b, the AMF and the V-SMF may transmit Namf_Communication_NIN2MessageTransfer through an Namf interface, the Namf_Communication_NIN2MessageTransfer including the TSCAI based on the system clock of the VPLMN.

Then, in step 3, the AMF transmits an N2 session request to a (R)AN through an N2 interface, the N2 session request including the TSCAI based on the system clock of the VPLMN.

The example shown in FIG. 10 may further include other steps. The 3GPP standard specification has defined the steps, and the steps are irrelevant to inventive content of the embodiments of the present disclosure. Therefore, details are not described herein again.

Figure 11:
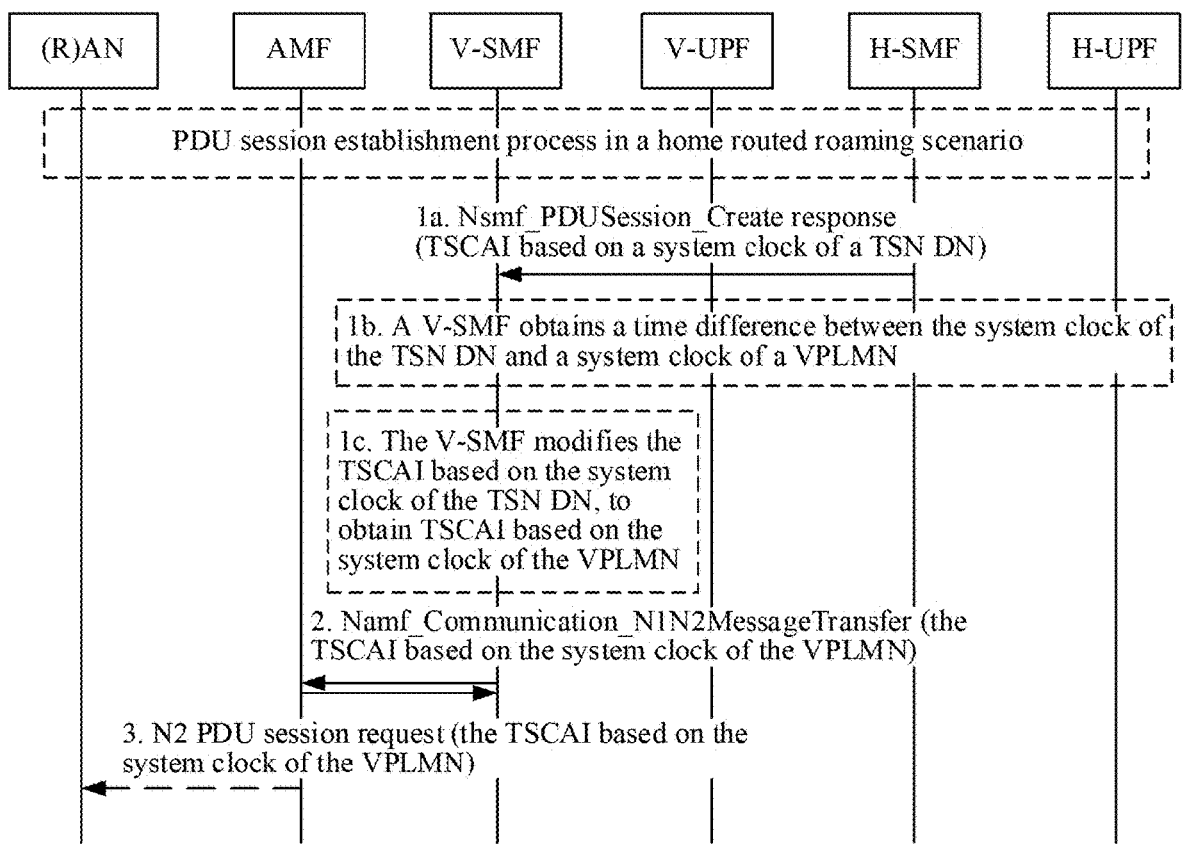
FIG. 11 is another schematic flowchart of determining a time parameter according to a third determining manner in a wireless TSC system according to an embodiment of the present disclosure.

FIG. 11 is another schematic flowchart of determining a time parameter according to a third determining manner in a wireless TSC system according to an embodiment of the present disclosure. An example shown in FIG. 11 is based on a PDU session establishment process in a UE home routed roaming scenario.

As shown in FIG. 11, in step 1a, an H-SMF may transmit an Nsmf_PDUSession_Create response to a V-SMF through an Nsmf interface, and the Nsmf_PDUSession_Create response includes TSCAI based on a system clock of a TSN DN, "burst arrival time" in the TSCAI being based on the system clock of the TSN DN.

In step 1b, the V-SMF obtains a time difference offset$_{(TSN,\ VPLMN)}$ between the system clock of the TSN DN and a system clock of a VPLMN. For example, as described above with reference to formula (2), offset$_{(TSN,\ VPLMN)}$ may be measured by the V-SMF or measured by a V-UPF and reported to the V-SMF.

A sequence of performing step 1a and step 1b is not limited in the embodiments of the present disclosure. For example, step 1a and step 1b may be performed simultaneously, or step 1a may be performed before step 1b, or step 1b may be performed before step 1a.

Then, in step 1c, the V-SMF may modify the TSCAI based on the system clock of the TSN DN into TSCAI based on the system clock of the VPLMN. For example, according to the third example described above, the V-SMF may modify, by using the formula (2) or formula (4), the TSCAI based on the system clock of the TSN DN into the TSCAI based on the system clock of the VPLMN according to the TSCAI based on the system clock of the TSN DN and the time difference offset$_{(TSN, VPLMN)}$ that is between the system clock of the TSN DN and the system clock of the VPLMN and that is obtained through step 1b. The "burst arrival time" in the modified TSCAI is based on the system clock of the VPLMN.

Subsequently, in step 2, the AMF and the V-SMF may transmit Namf_Communication_NIN2MessageTransfer through an Namf interface, the Namf_Communication_NIN2MessageTransfer including the TSCAI based on the system clock of the VPLMN.

Then, in step 3, the AMF transmits an N2 PDU session request to a (R)AN through an N2 interface, the N2 PDU session request including the TSCAI based on the system clock of the VPLMN.

The example shown in FIG. 11 may further include other steps. The 3GPP standard specification has defined the steps, and the steps are irrelevant to inventive content of the embodiments of the present disclosure. Therefore, details are not described herein again.

Figure 12:
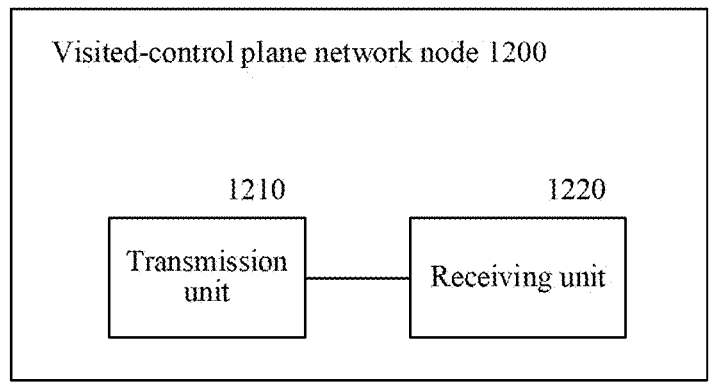
FIG. 12 is a schematic structural diagram of a visited-control plane network node according to an embodiment of the present disclosure.

The following describes a visited-control plane network node corresponding to the method shown in FIG. 2 according to an embodiment of the present disclosure with reference to FIG. 12. FIG. 12 is a schematic structural diagram of a visited-control plane network node 1200 according to an embodiment of the present disclosure. Because functions of the visited-control plane network node 1200 are the same as the functions of the visited-control plane network node in the method described above with reference to FIG. 2, for simplicity, detailed descriptions of the same content are omitted herein. As shown in FIG. 12, the visited-control plane network node 1200 includes a transmission unit 1210 and a receiving unit 1220. The transmission unit 1210 includes circuitry that is configured to transmit first information to a home-control plane network node, the first information indicating a time parameter determining manner supported by the visited-control plane network node. The receiving unit 1220 includes circuitry that is configured to receive second information from the home-control plane network node, the second information indicating a time parameter determining manner to be used by the visited-control plane network node. In addition to the two units, the visited-control plane network node 1200 may further include other components. However, because the components are irrelevant to the content of the embodiments of the present disclosure, illustration and description of the components are omitted herein.

In this embodiment of the present disclosure, there may be one or more time parameter determining manners supported by the visited-control plane network node. For example, there may be three time parameter determining manners supported by the visited-control plane network node, namely, a first determining manner, a second determining manner, and a third determining manner. Specifically, the first determining manner may mean that the visited-control plane network node determines a time parameter partially with the help of the home-control plane network node, the second determining manner may mean that the visited-control plane network node determines a time parameter completely with the help of the home-control plane network node, and the third determining manner may mean that the visited-control plane network node determines a time parameter without the help of the home-control plane network node. Such a plurality of determining manners may be applied to different operators, thereby enhancing universality of applications.

According to the first implementation of this embodiment of the present disclosure, the visited-control plane network node 1200 may further include a processing unit (not shown in the figure) that includes circuitry, such as processing circuitry, configured to generate the first information according to a measurement capability of a visited-user plane network node (for example, the V-UPF entity 105 in FIG. 1) to a time difference between system clocks of different networks. Specifically, the visited-control plane network node may first determine the measurement capability of the visited-user plane network node to the time difference between the system clocks of the different networks. Subsequently, the visited-control plane network node may determine, according to the measurement capability of the visited-user plane network node to the time difference between the system clocks of the different networks, the time parameter determining manner that the visited-control plane network node can support. Then, the visited-control plane network node may generate the first information according to the determined time parameter determining manner.

In the first implementation, the processing unit may determine the measurement capability of the visited-user plane network node to the time difference between the system clocks of the different networks in the following manner.

Specifically, the processing unit may transmit request information to the visited-user plane network node, the request information being used for requesting the visited-user plane network node to feed back the measurement capability of the visited-user plane network node to the time difference between the system clocks of the different networks to the visited-control plane network node. For example, the request information may be used for requesting the visited-user plane network node to feed back, to the visited-control plane network node, the measurement capability of the visited-user plane network node to at least one of the time difference between the system clock of the TSN DN and the system clock of the network (that is, the VPLMN) to which the visited-control plane network node belongs, the time difference between the system clock of the network (that is, the VPLMN) to which the visited-control plane network node belongs and the system clock of the network (that is, the HPLMN) to which the home-control plane network node belongs, and the like.

Then, the processing unit may receive response information from the visited-user plane network node, the response information indicating the measurement capability of the visited-user plane network node to the time difference between the system clocks of the different networks. Specifically, the response information may include a predetermined quantity of bits, and values of the predetermined quantity of bits may indicate the measurement capability of the visited-user plane network node to the time difference between the system clocks of the different networks.

In addition, according to the second implementation of this embodiment of the present disclosure, the visited-control plane network node 1200 may further include a processing unit (not shown in the figure) that includes circuitry, such as processing circuitry, configured to generate the first information according to a measurement capability of the visited-control plane network node to a time difference between system clocks of different networks. Specifically, the visited-control plane network node may determine, according to the measurement capability of the visited-control plane network node to the time difference between the system clocks of the different networks, the time parameter determining manner that the visited-control plane network node can support. Then, the visited-control plane network node may generate the first information according to the determined time parameter determining manner.

In addition, according to the third implementation of the embodiments of the present disclosure, the visited-control plane network node 1200 may further include a processing unit (not shown in the figure) that includes circuitry, such as processing circuitry, configured to generate the first information according to both the measurement capability of the visited-user plane network node (for example, the V-UPF entity 105 in FIG. 1) to the time difference between the system clocks of the different networks and the measurement capability of the visited-control plane network node to the time difference between the system clocks of the different networks. The third implementation is a combination of the first implementation and the second implementation described above, and details are not described herein again.

In the foregoing first implementation, second implementation, and third implementation, the first information may implicitly or explicitly indicate the time parameter determining manner supported by the visited-control plane network node, which is not limited in this embodiment of the present disclosure.

In addition, in the second determining manner, the visited-control plane network node determines the time parameter completely with the help of the home-control plane network node. Therefore, the visited-control plane network node can always support the second determining manner. Therefore, the first information may not indicate the second determining manner.

In addition, in the embodiments of the present disclosure, the processing unit may determine the time parameter according to the second information. Specifically, the processing unit may determine, according to the second information, the time parameter determining manner to be used by the visited-control plane network node, and then determine the time parameter by using the determined time parameter determining manner.

The "time parameter" described herein may be TSCAI based on the system clock of the network (that is, the VPLMN) to which the visited-control plane network node belongs. The TSCAI may include one or more of information indicating a direction of a TSC service (for example, an uplink or a downlink), transmission period of data in the TSC service, burst arrival time in the TSC service, and the like.

Through the description of the "time parameter", that the processing unit determines the time parameter according to the second information may be specifically that the processing unit determines "burst arrival time" in the time parameter according to the second information. That is, the processing unit may determine, according to the second information, the time parameter determining manner to be used by the visited-control plane network node, and then determine the "burst arrival time" in the time parameter by using the determined time parameter determining manner.

A schematic process that the visited-control plane network node determines the "burst arrival time" in the time parameter by using the determined time parameter determining manner is described in detail in the following. In the following, for convenience, the time parameter determined by the visited-control plane network node by using the determined time parameter determining manner is referred to as a "second time parameter".

According to the first example of this embodiment of the present disclosure, when the second information indicates that the time parameter determining manner to be used by the visited-control plane network node is the first determining manner, the processing unit may determine the "burst arrival time" in the time parameter by using the first determining manner.

Specifically, in the first example, the receiving unit 1220 may receive a first time parameter from the home-control plane network node, the first time parameter being a time parameter based on a system clock of a network to which the home-control plane network node belongs. Then, the processing unit may determine the second time parameter at least according to the first time parameter, the second time parameter being a time parameter based on a system clock of a network to which the visited-control plane network node belongs. For example, the processing unit may determine the second time parameter according to the first time parameter and a time difference between the system clock of the network to which the home-control plane network node belongs and the system clock of the network to which the visited-control plane network node belongs.

According to the second example of this embodiment of the present disclosure, when the second information indicates that the time parameter determining manner to be used by the visited-control plane network node is the second determining manner, the processing unit may determine the "burst arrival time" in the time parameter by using the second determining manner.

Specifically, in the second example, the receiving unit 1220 may receive the second time parameter from the home-control plane network node, the second time parameter being a time parameter based on the system clock of the network to which the visited-control plane network node belongs.

According to the third example of this embodiment of the present disclosure, when the second information indicates that the time parameter determining manner to be used by the visited-control plane network node is the third determining manner, the processing unit may determine the "burst arrival time" in the time parameter by using the third determining manner.

Specifically, in the third example, the receiving unit 1220 may receive a third time parameter from the home-control plane network node, the third time parameter being a time parameter based on the system clock of the external network of the network to which the home-control plane network node belongs. Then, the processing unit may determine the second time parameter at least according to the third time parameter, the second time parameter being a time parameter based on the system clock of the network to which the visited-control plane network node belongs. For example, the visited-control plane network node may determine the second time parameter according to the third time parameter and a time difference between the system clock of the external network of the network to which the home-control plane network node belongs and the system clock of the network to which the visited-control plane network node belongs.

According to the visited-control plane network node of this embodiment, the visited-control plane network node may transmit information used for indicating a time parameter determining manner supported by the visited-control plane network node to the home-control plane network node, and receive, from the home-control plane network node, information used for indicating a time parameter determining manner to be used by the visited-control plane network node, so that the time parameter determining manner to be used by the visited-control plane network node is controlled by the home-control plane network node, and the visited-control plane network node determines a time parameter according to the time parameter determining manner, to provide an accurate time parameter to a RAN. In this way, a problem of inaccurate "burst arrival time" in TSCAI due to clock skew caused by a time difference between a VPLMN and an HPLMN or different master clocks used by the VPLMN and the HPLMN even if the VPLMN and the HPLMN are in the same time zone is avoided.

Figure 13:
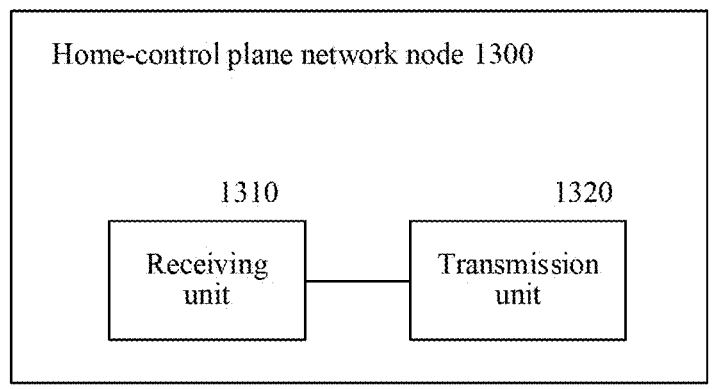
FIG. 13 is a schematic structural diagram of a home-control plane network node according to an embodiment of the present disclosure.

The following describes a home-control plane network node corresponding to the method shown in FIG. 4 according to an embodiment of the present disclosure with reference to FIG. 13. FIG. 13 is a schematic structural diagram of a home-control plane network node 1300 according to an embodiment of the present disclosure. Because functions of the home-control plane network node 1300 are the same as the functions of the home-control plane network node in the method described above with reference to FIG. 4, for simplicity, detailed descriptions of the same content are omitted herein. As shown in FIG. 13, the home-control plane network node 1300 includes a receiving unit 1310 and a transmission unit 1320. The receiving unit 1310 includes circuitry that is configured to receive first information from a visited-control plane network node, the first information indicating a time parameter determining manner supported by the visited-control plane network node. The transmission unit 1320 includes circuitry that is configured to transmit second information to the visited-control plane network node, the second information indicating a time parameter determining manner to be used by the visited-control plane network node. In addition to the two units, the home-control plane network node 1300 may further include other components. However, because the components are irrelevant to the content of the embodiments of the present disclosure, illustration and description of the components are omitted herein.

In this embodiment of the present disclosure, there may be one or more time parameter determining manners supported by the visited-control plane network node. For example, there may be three time parameter determining manners supported by the visited-control plane network node, namely, a first determining manner, a second determining manner, and a third determining manner. Specifically, the first determining manner may mean that the visited-control plane network node determines a time parameter partially with the help of the home-control plane network node, the second determining manner may mean that the visited-control plane network node determines a time parameter completely with the help of the home-control plane network node, and the third determining manner may mean that the visited-control plane network node determines a time parameter without the help of the home-control plane network node.

In this embodiment of the present disclosure, the home-control plane network node may determine, according to the first information received by the receiving unit 1310, time parameter determining manners supported by the visited-control plane network node, and select one of the time parameter determining manners supported by the visited-control plane network node as the time parameter determining manner to be used by the visited-control plane network node. Then, the home-control plane network node may notify the visited-control plane network node through the second information transmitted by the transmission unit 1320.

The "time parameter" described herein may be TSCAI based on the system clock of the network (that is, the VPLMN) to which the visited-control plane network node belongs. The TSCAI may include one or more of information indicating a direction of a TSC service (for example, an uplink or a downlink), transmission period of data in the TSC service, burst arrival time in the TSC service, and the like. In the following, for convenience, the time parameter determined by the visited-control plane network node by using the determined time parameter determining manner is referred to as a "second time parameter".

According to the first example of the present disclosure, when the second information indicates that the time parameter determining manner to be used by the visited-control plane network node is the first determining manner, the transmission unit 1320 may transmit the first time parameter to the visited-control plane network node, the first time parameter being a time parameter based on the system clock of the network to which the home-control plane network node belongs. Correspondingly, the visited-control plane network node determines the second time parameter at least according to the first time parameter, the second time parameter being a time parameter based on a system clock of a network to which the visited-control plane network node belongs. For example, the visited-control plane network node may determine the second time parameter according to the first time parameter and a time difference between the system clock of the network to which the home-control plane network node belongs and the system clock of the network to which the visited-control plane network node belongs.

According to the second example of the present disclosure, when the second information indicates that the time parameter determining manner to be used by the visited-control plane network node is the second determining manner, the transmission unit 1320 may transmit the second time parameter to the visited-control plane network node, the second time parameter being a time parameter based on the system clock of the network to which the visited-control plane network node belongs.

According to the third example of the present disclosure, when the second information indicates that the time parameter determining manner to be used by the visited-control plane network node is the third determining manner, the transmission unit 1320 may transmit the third time parameter to the visited-control plane network node, the third time parameter being a time parameter based on a system clock of an external network of the network to which the home-control plane network node belongs. Correspondingly, the visited-control plane network node may determine the second time parameter at least according to the third time parameter, the second time parameter being a time parameter based on the system clock of the network to which the visited-control plane network node belongs. For example, the visited-control plane network node may determine the second time parameter according to the third time parameter and a time difference between the system clock of the external network of the network to which the home-control plane network node belongs and the system clock of the network to which the visited-control plane network node belongs.

According to the home-control plane network node of this embodiment, the home-control plane network node may receive, from the visited-control plane network node, information used for indicating a time parameter determining manner supported by the visited-control plane network node, and transmit information used for indicating a time parameter determining manner to be used by the visited-control plane network node to the visited-control plane network node, so that the time parameter determining manner to be used by the visited-control plane network node is controlled by the home-control plane network node, and the visited-control plane network node determines a time parameter according to the time parameter determining manner, to provide an accurate time parameter to a RAN. In this way, a problem of inaccurate "burst arrival time" in TSCAI due to clock skew caused by a time difference between a VPLMN and an HPLMN or different master clocks used by the VPLMN and the HPLMN even if the VPLMN and the HPLMN are in the same time zone is avoided.

The embodiments of the present disclosure provide a visited-control plane network node, including circuitry, such as a processor and a memory. The memory, which is a non-transitory computer-readable medium, may store a computer-executable program, and the processor is configured to execute the computer-executable program, to perform the clock synchronization method according to the foregoing embodiments.

The embodiments of the present disclosure provide a home-control plane network node, including circuitry, such as a processor and a memory, where the memory is a non-transitory computer-readable medium, and stores a computer-executable program. The processor is configured to execute the computer-executable program, to perform the clock synchronization method according to the foregoing embodiments.

Figure 14:
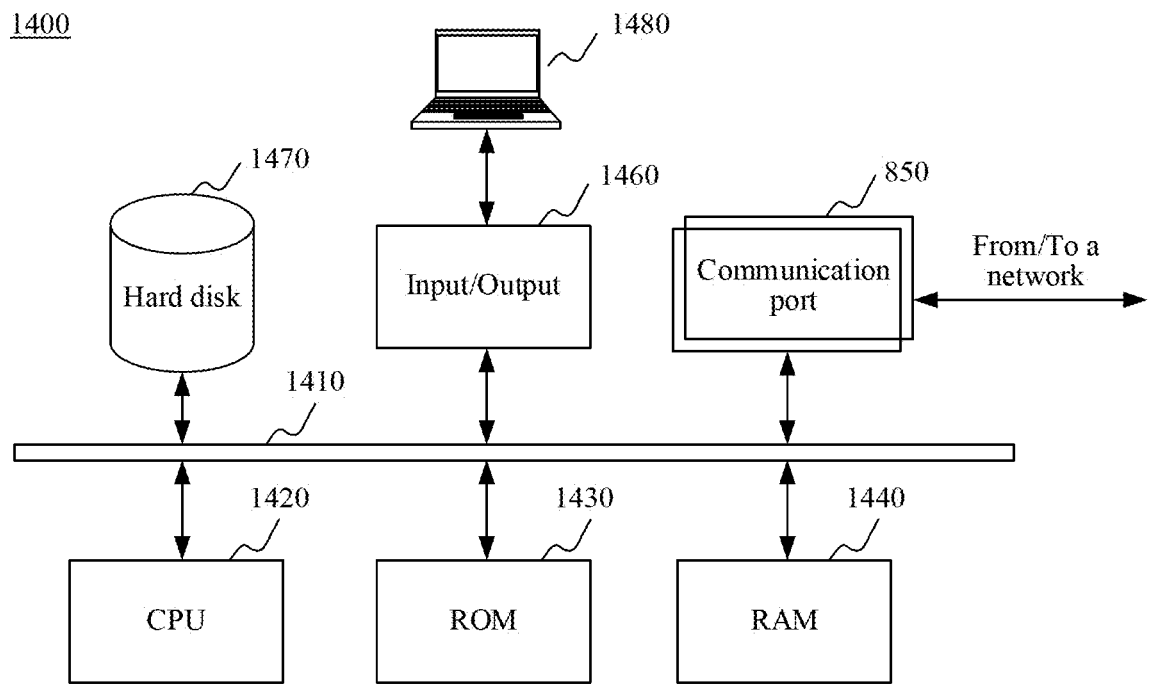
FIG. 14 is a schematic diagram of an architecture of a device according to an embodiment of the present disclosure.

In addition, devices (for example, a terminal, a visited-control plane network node, and a home-control plane network node) of the embodiments of the present disclosure may alternatively be implemented by using an architecture of a computing device shown in FIG. 14. FIG. 14 shows the architecture of the computing device. As shown in FIG. 14, the computing device 1400 may include a bus 1410, one or more CPUs 1420, a read-only memory (ROM) 1430, a random access memory (RAM) 1440, a communication port 1450 connected to a network, an input/output component 1460, a hard disk 1470, and the like. As one of ordinary skill will recognize, these components may be implemented by circuitry that performs their corresponding functions. A storage device, for example, the ROM 1430 or the hard disk 1470, in the computing device 1400 may store various data or files used in computer processing and/or communication and program instructions executed by the CPU. The computing device 1400 may further include a user interface 1480. As can be appreciated, the architecture shown in FIG. 14 is exemplary, and when different devices are implemented, one or more components in the computing device shown in FIG. 14 may be omitted or changed, and additional components may be added, according to actual need.

An embodiment of the present disclosure further provides a computer program including computer instructions that are stored in a non-transitory computer-readable storage medium. A processor of a computer device may read the computer instructions from the computer-readable storage medium, and execute the computer instructions, to perform the clock synchronization method provided in the various implementations.

The embodiments of the present disclosure may alternatively be implemented as a non-transitory computer-readable storage medium. Computer-readable instructions are stored on the non-transitory computer-readable storage medium according to this embodiment of the present disclosure. The computer-readable instructions, when executed by one or more processors, may perform the method according to the embodiments of the present disclosure described with reference to the foregoing accompanying drawings. The non-transitory computer-readable storage medium includes, but is not limited to, a volatile memory and/or a non-volatile memory. For example, the volatile memory may include a RAM and/or a high-speed cache. For example, the non-volatile memory may include a ROM, a hard disk, and a flash memory.

A person skilled in the art will recognize that, the embodiments of the present disclosure may have various variations and improvements. For example, the devices or components described above may be implemented by using hardware, or may be implemented by using software, firmware, or a combination of some of or all of the software, the firmware, and the hardware. However, these variations and/or modifications to the embodiments remain within the scope of the present disclosure.

In addition, as shown in the embodiments of the present disclosure and the claims, words such as "a/an", "one", and/or "the" do not refer specifically to singular forms and may also include plural forms, unless the context expressly indicates an exception. The "first", the "second" and similar terms used in the embodiments of the present disclosure do not indicate any order, quantity or significance, but are used to only distinguish different components. Similarly, "include", "including", or similar terms mean that elements or items appearing before the term cover elements or items listed after the term and their equivalents, but do not exclude other elements or items. A similar term such as "connect" or "connection" is not limited to a physical or mechanical connection, but may include an electrical connection, whether direct or indirect.

Flowcharts are also used in the embodiments of the present disclosure to illustrate operations performed by the wireless TSC system according to the embodiments of the present disclosure. However, it is to be understood that the operations illustrated in the flowcharts may be performed in an order other than the order illustrated, including reverse order or even simultaneously. Other operations may also be added to or deleted from the processes illustrated in the flowcharts without limitation.

Unless otherwise defined, all terms (including technical and scientific terms) used herein have the same meaning as commonly understood by one of ordinary skill in the art at the time this application was filed. It is further to be understood that, the terms such as those defined in commonly used dictionaries are to be interpreted as having meanings that are consistent with the meanings in the context of the related art, and are not to be interpreted in an idealized or formalized sense, unless expressively so defined herein.

The embodiments of the present disclosure are described above in detail. However, it will be apparent to a person skilled in the art that the present disclosure is not limited to the implementations described in this specification. The present disclosure may be implemented as modifications and changes without departing from the spirit and scope of the present disclosure determined by the description of the claims. Therefore, the description in this specification is for the purpose of illustration and does not have any restrictive meaning for the present disclosure.

What is claimed is:

1. A method executed by a user-plane network node, the method comprising:
   determining, with processing circuitry of the user-plane network node, a time difference between a system clock of an external network of the user-plane network node and a system clock of a network to which the user-plane network node belongs; and
   transmitting, to a control-plane network node, information including the time difference,
   wherein, the time difference is used by the control-plane network node to determine a time parameter of the system clock of the network to which the user-plane network node belongs, the time parameter is time-sensitive communication assistance information, and the transmitting the information is independent of a particular Protocol Data Unit (PDU) session.

2. The method according to claim 1, wherein the user-plane network node is independent of other user-plane network nodes that participate in the particular PDU session.

3. The method according to claim 1, wherein the external network of the user-plane network node is a time-sensitive network.

4. The method according to claim 1, wherein the network that the user-plane network node belongs is a Public Land Mobile Network.

5. The method according to claim 4, wherein the network that the user-plane network node belongs is a 5G communication network.

6. The method according to claim 5, wherein the user-plane network node is a user-plane function entity, and the control-plane network node is a session management function entity.

7. The method according to claim 1, wherein the determining the time difference comprises:
   measuring the time difference between the system clock of the external network of the user-plane network node and the system clock of the network that the user-plane network node belongs.

8. A user-plane network node, comprising:
   processing circuitry configured to:
      determine a time difference between a system clock of an external network of the user-plane network node and a system clock of a network to which the user-plane network node belongs; and
      transmit, to a control-plane network node, information including the time difference,
      wherein, the time difference is used by the control-plane network node to determine a time parameter of the system clock of the network to which the user-plane network node belongs, the time parameter is time-sensitive communication assistance information, and the transmitting the information is independent of a particular Protocol Data Unit (PDU) session.

9. The user-plane network node according to claim 8, wherein the user-plane network node is independent of other user-plane network nodes that participate in the particular PDU session.

10. The user-plane network node according to claim 8, wherein the external network of the user-plane network node is a time-sensitive network.

11. The user-plane network node according to claim 8, wherein the network that the user-plane network node belongs is a Public Land Mobile Network.

12. The user-plane network node according to claim 11, wherein the network that the user-plane network node belongs is a 5G communication network.

13. The user-plane network node according to claim 12, wherein the user-plane network node is a user-plane function entity, and the control-plane network node is a session management function entity.

14. The user-plane network node according to claim 8, wherein the processing circuitry is configured to:
   measure the time difference between the system clock of the external network of the user-plane network node and the system clock of the network that the user-plane network node belongs.

15. A non-transitory computer-readable storage medium storing instructions, which when executed by at least one processor, cause the at least one processor to perform:
   determining, with processing circuitry of a user-plane network node, a time difference between a system clock of an external network of the user-plane network node and a system clock of a network to which the user-plane network node belongs; and
   transmitting, to a control-plane network node, information including the time difference,
   wherein, the time difference is used by the control-plane network node to determine a time parameter of the system clock of the network to which the user-plane network node belongs, the time parameter is time-sensitive communication assistance information, and the transmitting the information is independent of a particular Protocol Data Unit (PDU) session.

16. The non-transitory computer-readable storage medium according to claim 15, wherein the user-plane network node is independent of other user-plane network nodes that participate in the particular PDU session.

17. The non-transitory computer-readable storage medium according to claim 15, wherein the external network of the user-plane network node is a time-sensitive network.

18. The non-transitory computer-readable storage medium according to claim 15, wherein the network that the user-plane network node belongs is a Public Land Mobile Network.

19. The non-transitory computer-readable storage medium according to claim 18, wherein the network that the user-plane network node belongs is a 5G communication network.

20. The non-transitory computer-readable storage medium according to claim 19, wherein the user-plane network node is a user-plane function entity, and the control-plane network node is a session management function entity.

* * * * *